(12) United States Patent
Komori et al.

(10) Patent No.: US 8,561,570 B2
(45) Date of Patent: Oct. 22, 2013

(54) DROPLET DISCHARGE DEVICE AND METHOD FOR FORMING THIN FILM

(75) Inventors: Sadaharu Komori, Nagano (JP); Tsuyoshi Kato, Nagano (JP); Tamotsu Goto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 759 days.

(21) Appl. No.: 12/717,757

(22) Filed: Mar. 4, 2010

(65) Prior Publication Data

US 2010/0247743 A1  Sep. 30, 2010

(30) Foreign Application Priority Data

Mar. 26, 2009  (JP) ................................. 2009-075906

(51) Int. Cl.
- *B05C 11/00* (2006.01)
- *B05B 3/00* (2006.01)
- *B05B 7/06* (2006.01)
- *B41J 29/38* (2006.01)
- *B41J 29/393* (2006.01)
- *B41J 2/045* (2006.01)

(52) U.S. Cl.
USPC ........... 118/665; 118/692; 118/698; 118/313; 118/315; 118/323; 118/305; 347/10; 347/19; 347/68

(58) Field of Classification Search
USPC ......... 118/300, 313–315, 712, 713, 305, 663, 118/665, 692, 698, 323; 347/9–13, 19, 68
See application file for complete search history.

(56) References Cited

U.S. PATENT DOCUMENTS

| 6,893,103 | B2 | 5/2005 | Okada et al. | |
| 2007/0070102 | A1* | 3/2007 | Takata | 347/10 |
| 2007/0111626 | A1* | 5/2007 | Kato | 445/14 |

FOREIGN PATENT DOCUMENTS

| JP | 2002-196127 A | 7/2002 |
| JP | 2006-289765 A | 10/2006 |

* cited by examiner

*Primary Examiner* — Yewebdar Tadesse
(74) *Attorney, Agent, or Firm* — Global IP Counselors, LLP

(57) ABSTRACT

A droplet discharge device is configured to control the drive corresponding to a prescribed set of the nozzles selected to discharge droplets during a main scan when the droplets are arranged in the first partition regions, based on a pre-measured distribution of a droplet discharge amount of each of the prescribed set of the nozzles so that the droplet discharge amount approximates a predetermined optimal amount, and to control the drive waveforms corresponding to the nozzles included in a plurality of potential combinations of the nozzles selected to discharge droplets during a main scan when the droplets are arranged in the second partition regions, based on a pre-measured distribution of an average droplet discharge amount calculated from an amount of droplets discharged from the each of the nozzles in all the potential combinations so that the droplet discharge amount approximates the predetermined optimal amount.

7 Claims, 18 Drawing Sheets

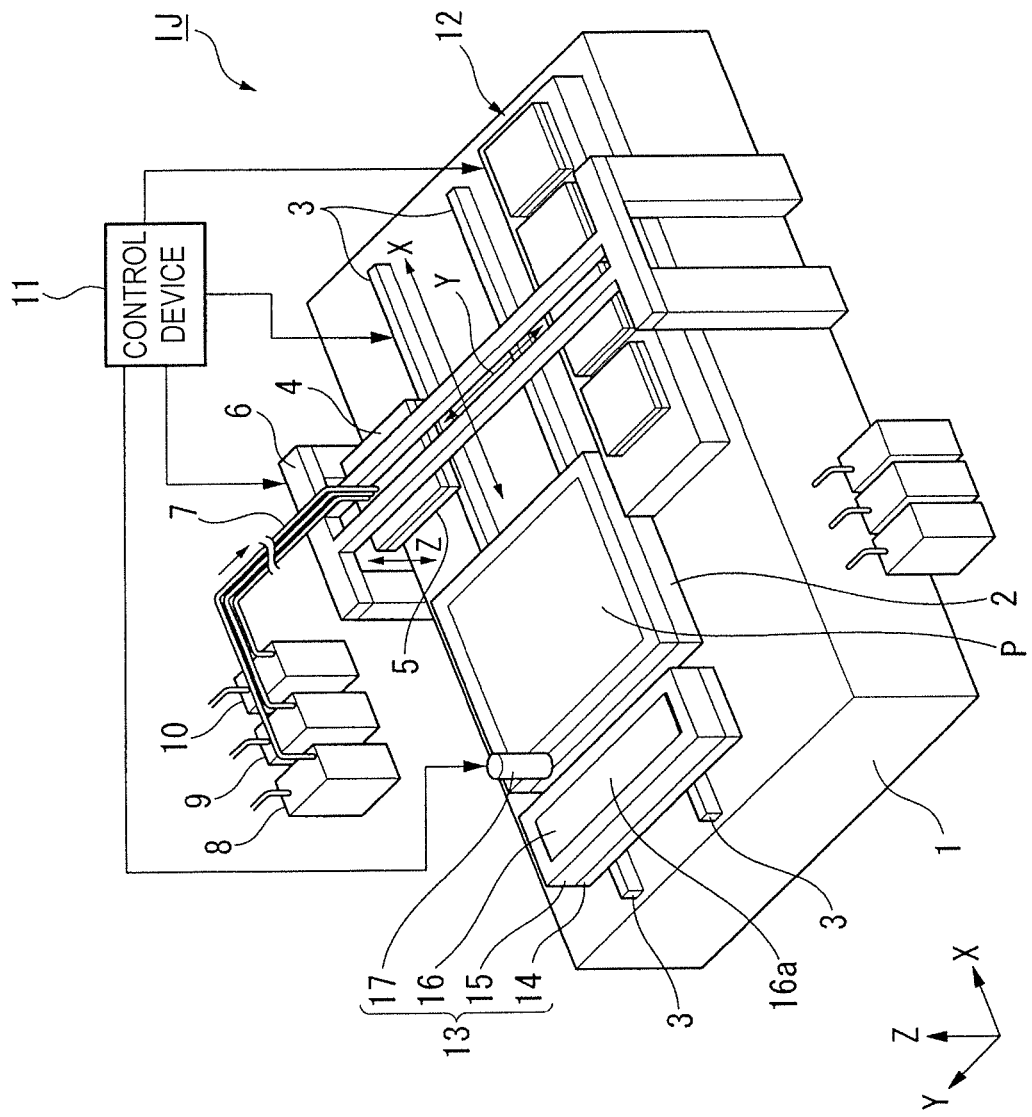
F I G. 1

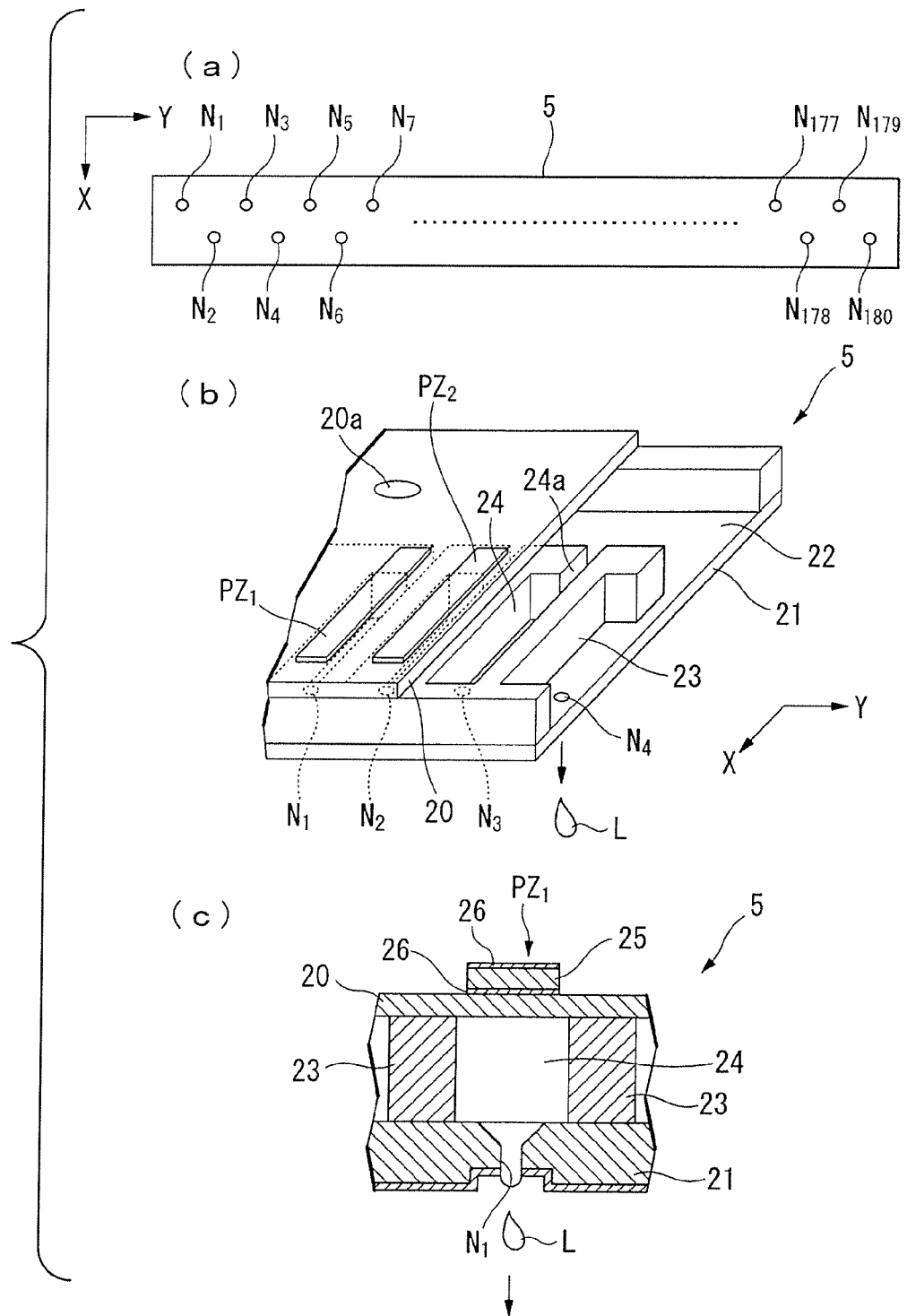
F I G. 2

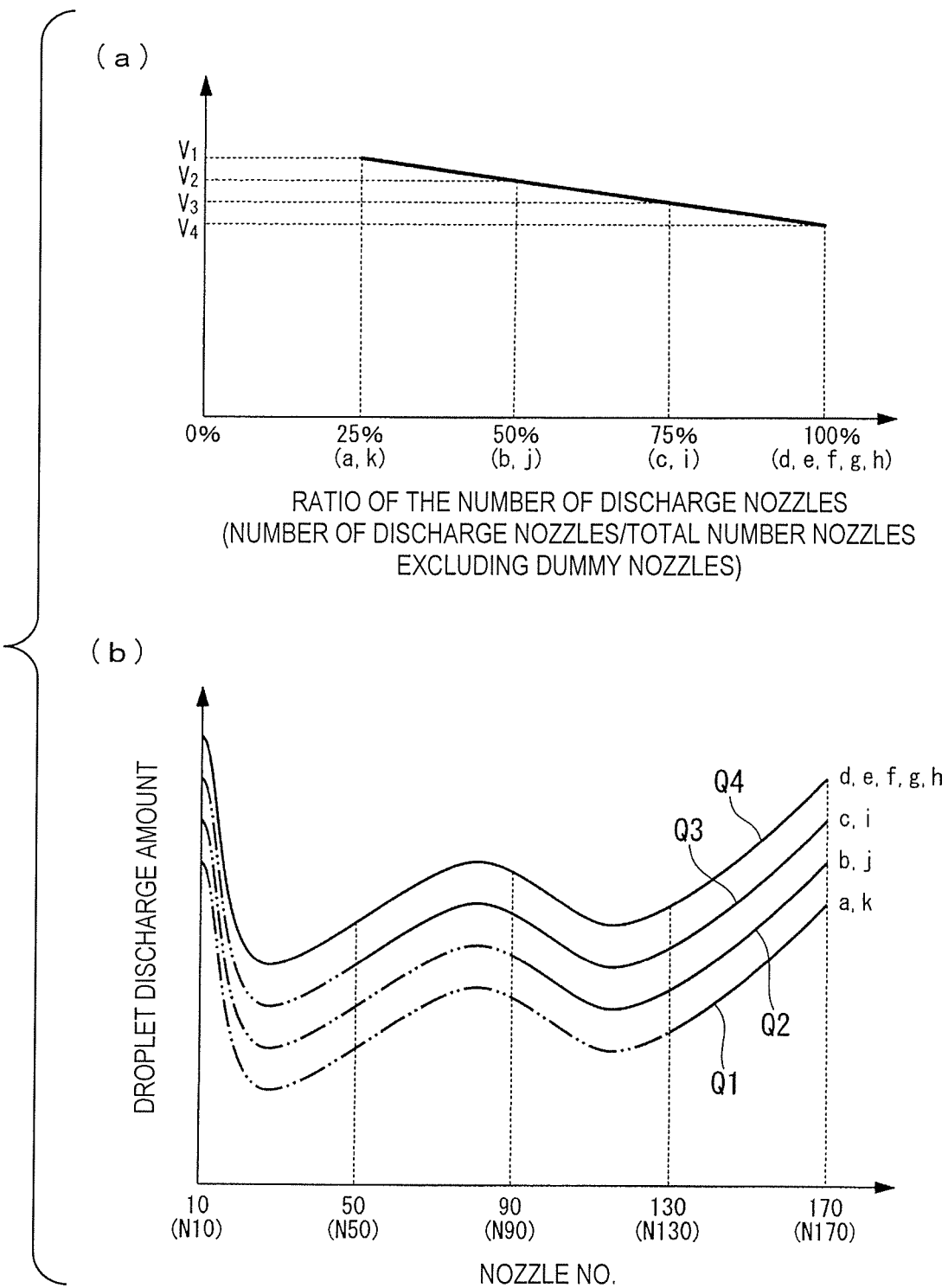
F I G. 6

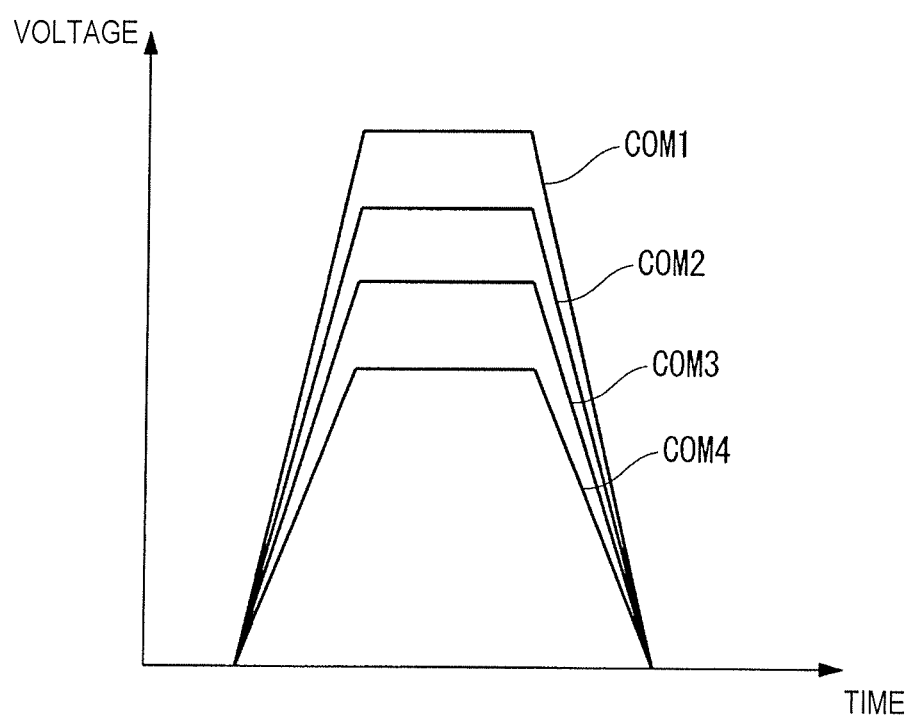
F I G. 12

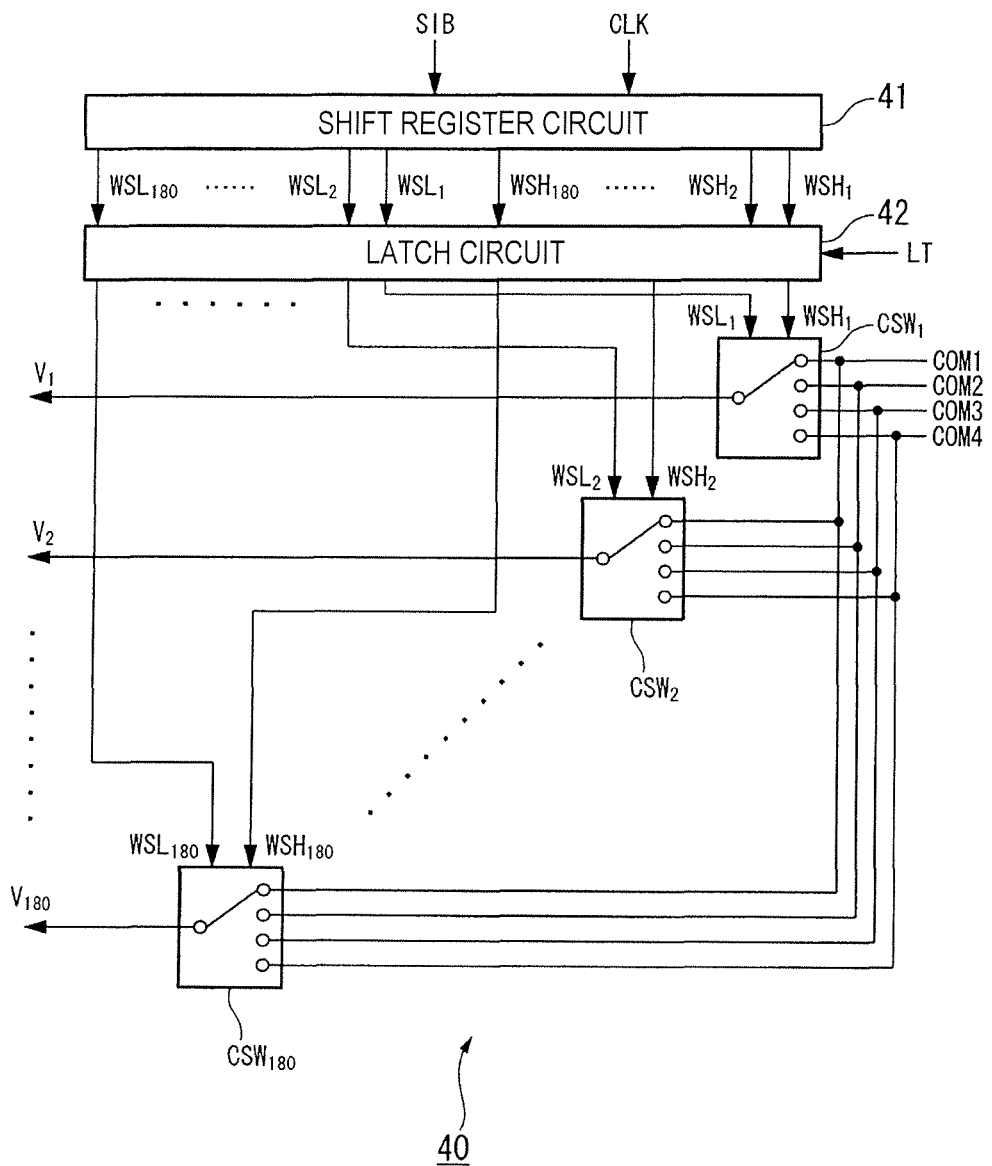
F I G. 14

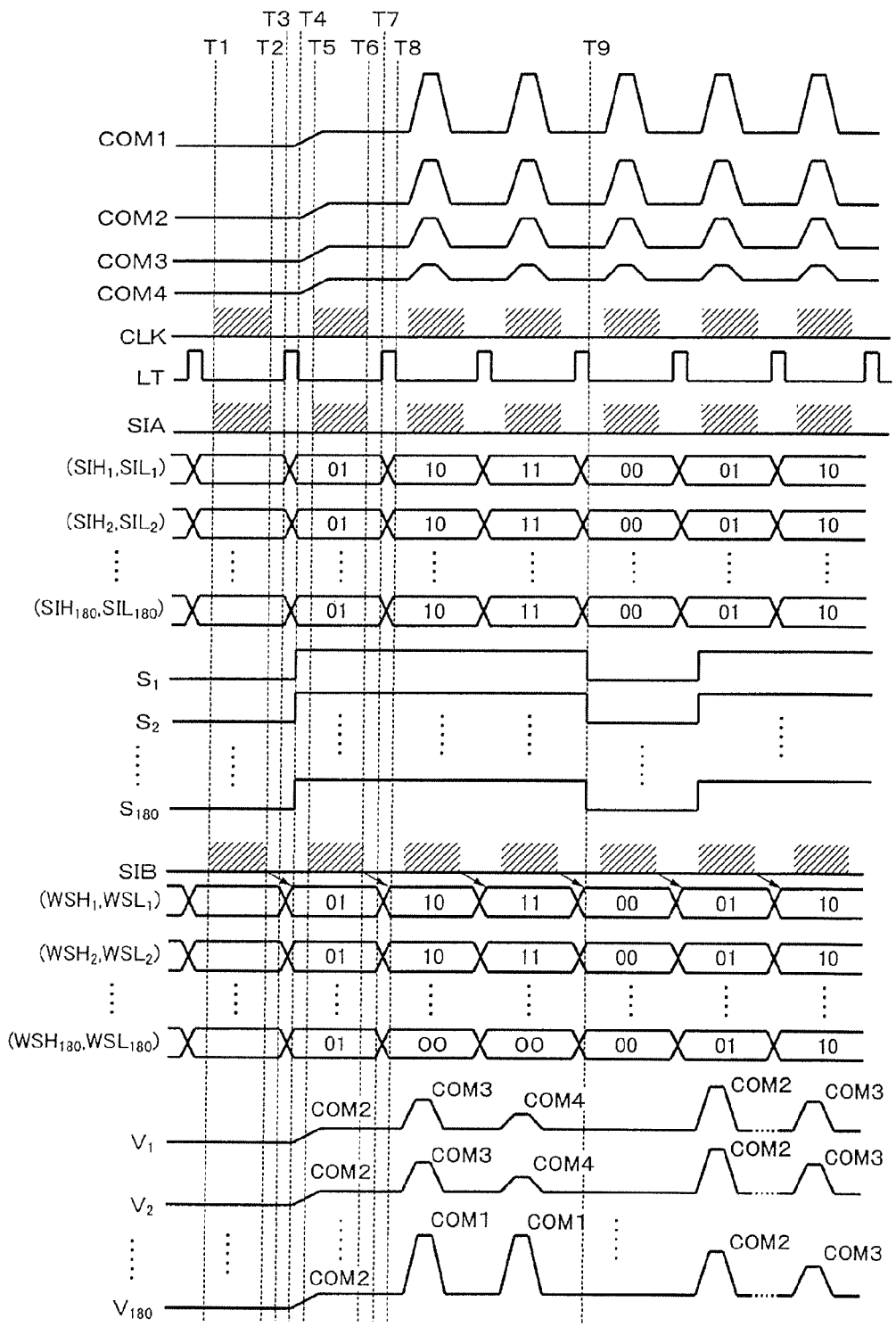
F I G. 16

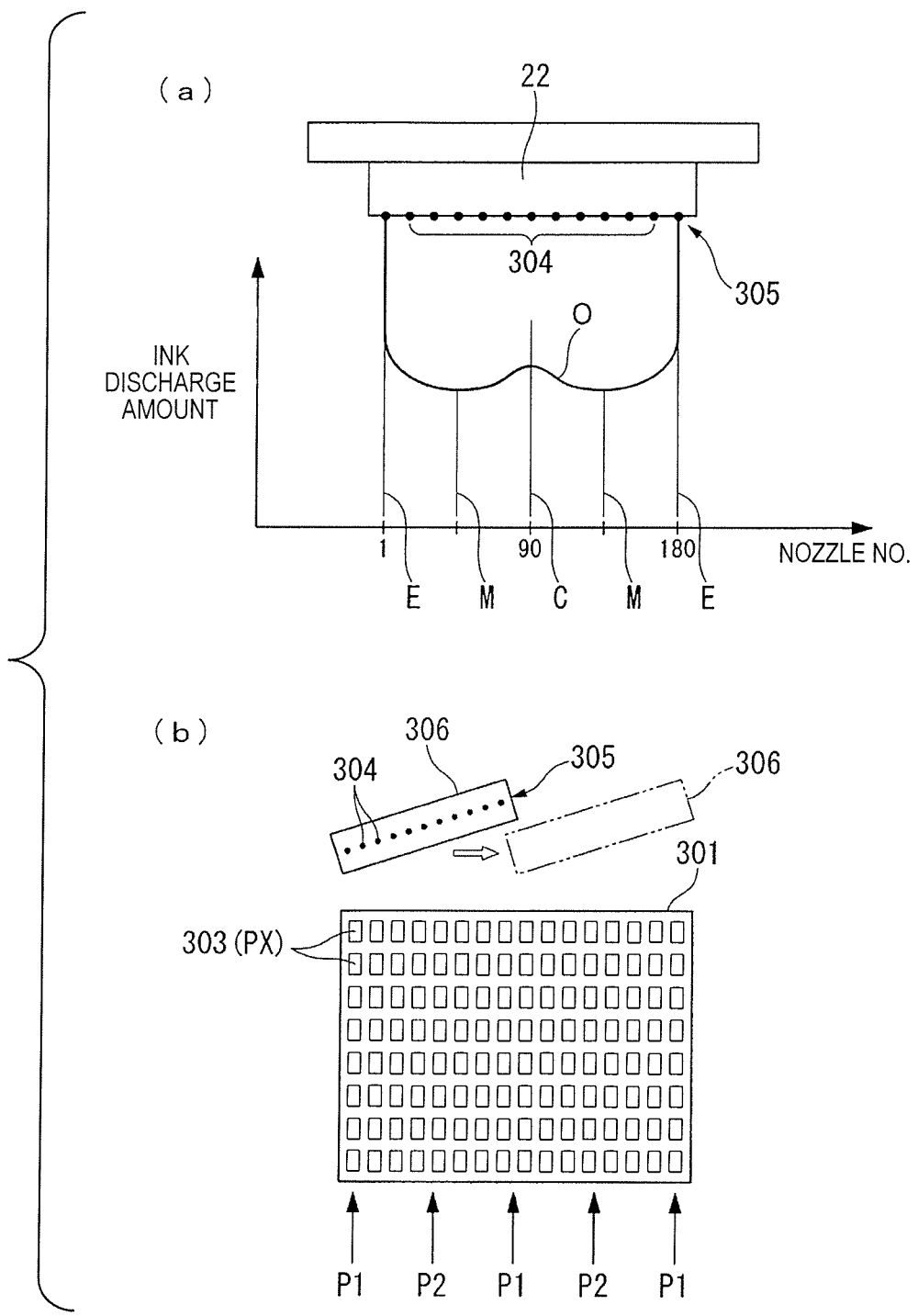
F I G. 18

DROPLET DISCHARGE DEVICE AND METHOD FOR FORMING THIN FILM

CROSS-REFERENCE TO RELATED APPLICATIONS

This application claims priority to Japanese Patent Application No. 2009-075906 filed on Mar. 26, 2009. The entire disclosure of Japanese Patent Application No. 2009-075906 is hereby incorporated herein by reference.

BACKGROUND

1. Technical Field

The present invention relates to a droplet discharge device and a method for forming a thin film.

2. Related Art

There are conventionally known techniques for forming a thin film that use a droplet discharge device. A typical example of a thin film formed using a droplet discharge device is a luminous layer of a color filter or an organic EL panel. In thin film formation techniques that use a droplet discharge device, very small droplets can be coated in a desired position in accordance with the resolution of the droplet discharge head that is used. Accordingly, a much finer pattern can be formed than achieved with relief printing and other printing techniques. For example, when a red, green, and blue color filter is formed on a color filter substrate, a color filter can be formed by discharging a solution containing red, green, and blue coloring material from very small nozzles onto a substrate, and then drying and solidifying the coloring material (e.g., see Japanese Laid-Open Patent Application No. 2002-196127 and Japanese Laid-Open Patent Application No. 2006-289765).

Recently, a method has been developed for manufacturing a color filter substrate for a plurality of models by forming a color filter (panel region) for a plurality of models on a single large substrate and then dividing the substrate into separate models. In this method, a color filter substrate for a plurality of models can be fabricated using a single droplet discharge device, and the capital expenditure will thereby be lower than if a separate droplet discharge device has to be provided for each model. Since wasted space on the substrate can be reduced by manipulating the arrangement of each panel region, the material utilization ratio can be improved.

Considered below is the case in which a plurality of color filters 303 arranged in a punctate formation are formed using the droplet discharge method on a plurality of pixel regions PX positioned on the surface of a substrate 301, as shown in FIG. 18(b). In this case, the color filters 303 are formed in desired positions by, e.g., selectively discharging ink; i.e., color filter material, from a plurality of nozzles 304 while scanning droplet discharge heads 306, which have a nozzle row 305 in which a plurality of nozzles 304 is arranged in a row, in the main direction for a plurality of cycles (two cycles in FIG. 18(b)) as indicated by the arrows $A_1$ and $A_2$.

The color filter 303 is formed by arranging the colors R, G, B, or the like in a stripe arrangement, a delta arrangement, a mosaic arrangement, or another suitable arrangement mode. In the ink discharge step, droplet discharge heads 306 for discharging single colors of R, G, and B are provided in advance for the colors R, G, B, or the like, as shown in the drawing, and an array of the three colors R, G, B, or the like is formed on the single substrate 301 using the droplet discharge heads 306 in sequence.

The ink discharge amount is uneven in the nozzles 304 constituting the nozzle rows 305 in the droplet discharge heads 306, with discharge characteristics (discharge amount distribution) Q typically being demonstrated; i.e., a large discharge amount occurs in positions that correspond to the two ends of the nozzle rows 305, the second largest amount occurs in the center portions, and the lowest discharge amount occurs in the intermediate portions therebetween, as shown in FIG. 18(a).

Accordingly, when the color filter 303 is formed to a predetermined thickness by the droplet discharge heads 306, nonuniformity occurs in the ink arrangement amount (film thickness) among a plurality of the color filters 303 aligned in the sub-scanning direction orthogonal to the main scanning direction of the droplet discharge heads 306, due to nonuniformity of the ink discharge amount of the nozzles 304 constituting the nozzle rows 305. In this case, problems occur in that the planar light transmission characteristics of the color filter are uneven because stark striping (arrangement nonuniformity) is formed, e.g., in the positions P1 that correspond to the ends of the nozzle rows 305, the center position P2, or both positions P1 and P2. Also, such striped arrangement nonuniformities are highly visible and lead to a loss of image quality displayed via the color filters 303.

In view of the above, a method has been proposed in Japanese Laid-Open Patent Application No. 2002-196127 in which the nozzle rows 305 are divided into a plurality of groups and the amount of ink discharged from the nozzles 304 is controlled for each group. In accordance with this method, the ink discharge amount can be made more uniform among the nozzles 304 while the circuit configuration and the work of selecting the correction value can be simplified because the amount discharged by the nozzles 304 is adjusted for each group rather than for each nozzle 304.

On the other hand, nonuniformity of the discharge amount in the droplet discharge heads 306 is also caused by variation in the discharge pattern in each main scan. A discharge pattern is a combination of nozzles that discharge (discharging nozzles) and nozzles that do not discharge (non-discharging nozzles) among the plurality of nozzles 304 provided to a single droplet discharge head 306.

For example, when ink is discharged in only the pixel regions PX of the substrate 301, the nozzles 304 over on the pixel regions are used, and the nozzles 304 over the non-pixel regions are not used. Therefore, when the droplet discharge heads 306 move in the sub-scanning direction, the spatial arrangement between the nozzles 304 and the pixel regions becomes offset, and the combination of the discharge nozzles and the non-discharge nozzles; i.e., the discharge pattern, changes.

The reason that the spatial arrangement between the nozzles 304 and the pixel regions PX becomes offset when the sub-scan is carried out is that the movement distance in the sub-scan is carried out based on the interval between the nozzles of the droplet discharge heads 306. In other words, the sub-scan is designed to be carried out for a distance that is an integral multiple of the interval between nozzles. In the case that the sub-scan is set to an integral multiple of the interval between nozzles, the spatial arrangement between the nozzles 304 and the pixel regions PX is different for each main scan because the arrangement interval of the pixel regions PX is generally not an integral multiple of the interval between nozzles. Accordingly, cases occur in which nozzles arranged in the pixel regions PX in the main scan prior to the sub-scan are arranged in regions between pixels (non-pixel regions) in the main scan following the sub-scan, which produces a difference in the discharge pattern.

The discharge characteristics Q of the nozzles 304 also change when the discharge pattern changes. The change in the discharge characteristics Q produce structural crosstalk and electrical crosstalk in the droplet discharge heads 306. In other words, the discharge amount of adjacent nozzles 304 fluctuates due to mechanical vibrations and pressure transmission via the ink when the nozzles 304 are driven, and due to distortions (overshooting and undershooting) in the drive signals fed to the nozzles 304.

In order to solve such problems, a method is proposed in Japanese Laid-Open Patent Application No. 2006-2897652 for correcting the drive waveform fed to the drive elements of the nozzles 304 in accordance with the ratio of the number of discharge nozzles (number of discharge nozzles/total number of nozzles); i.e., the nozzle duty. In accordance with this method, it is possible to prevent fluctuations (electrical crosstalk) in the discharge amount of adjacent nozzles 304 caused by distortions in the drive signal fed to the nozzles 304.

SUMMARY

Despite it being possible in the method of Japanese Laid-Open Patent Application No. 2006-289765 to prevent fluctuations (electrical crosstalk) in the discharge amount caused by distortions in the drive signal, it is not possible to prevent fluctuations (structural crosstalk) in the discharge amount caused by mechanical vibrations from driving the nozzles 304, or by pressure transmission or the like via the ink. This is because changes in the discharge pattern as such cannot be prevented.

Accordingly, the discharge characteristics Q are measured for all possible discharge patterns, and it is possible to consider adjusting the drive waveform based on the discharge characteristics Q for each main scan. However, there is a problem in this method in that the combinations of the discharge patterns increase dramatically, the measurement time increases, and control becomes very complicated.

It is possible to consider selecting a typical discharge pattern (e.g., a discharge pattern for discharging ink from all the nozzles 304) and adjusting the discharge amount of all the discharge patterns based on the discharge characteristics Q in the typical discharge pattern. However, there is a problem in this method in that the ink discharge amount does not become uniform when the discharge characteristics of the typical discharge pattern and the discharge characteristics of an actual discharge pattern differ considerably.

When a color filter for a plurality of models is formed on the same substrate, it is possible that the discharge pattern for each model will vary considerably because the pixel pitch for each model is different. For example, in the color filter of a small liquid crystal panel, the pixel aperture ratio is reduced in comparison with a color filter for a large liquid crystal panel. Therefore, the ratio of the nozzles arranged in the non-pixel regions is higher. Accordingly, there is an increase in the structural crosstalk due to changes in the discharge pattern and the electrical crosstalk due to changes in the nozzle duty, and controlling the discharge amount is even further complicated.

The present invention was contrived in view of such circumstances, and an object thereof is to provide a droplet discharge device and a method for forming a thin film in which nonuniformity of the droplet discharge amount among nozzles is reduced using a simple configuration.

In order to solve the problems described above, a droplet discharge device according to a first aspect is adapted to arrange droplets onto a substrate including a first discharge region having a plurality of first partition regions arranged at a first interval in a first direction and a second discharge region having a plurality of second partition regions arranged at a second interval in the first direction that is different from the first interval. The droplet discharge device includes a droplet discharge head and a control unit. The droplet discharge head has a plurality of nozzles for discharging droplets and a plurality of drive elements provided in correspondence with the nozzles. The droplet discharge head is configured and arranged to discharge droplets from the nozzles at a predetermined timing while the droplet discharge head is scanned with respect to the substrate in a main scanning direction corresponding to a second direction of the substrate that is orthogonal to the first direction and a sub-scanning direction corresponding to the first direction at predetermined movement intervals so that the droplets are selectively discharged onto the first and second partition regions disposed on the substrate. The predetermined movement interval in the sub-scanning direction is equal to an integral multiple of the first interval. The control unit is configured to control the drive waveforms of a prescribed set of drive elements corresponding to a prescribed set of the nozzles selected to discharge droplets during each of a main scan when the droplets are arranged in the first partition regions, based on a pre-measured distribution of a droplet discharge amount of each of the prescribed set of the nozzles so that the droplet discharge amount of each of the prescribed set of the nozzles approximates a predetermined optimal amount when the droplets are arranged in the first partition regions. The control unit is also configured to control the drive waveforms of the drive elements corresponding to the nozzles included in a plurality of potential combinations of the nozzles selected to discharge droplets during a main scan when the droplets are arranged in the second partition regions, based on a pre-measured distribution of an average droplet discharge amount of each of the nozzles calculated from an amount of droplets discharged from the each of the nozzles in all the potential combinations so that the droplet discharge amount of each of the nozzles approximates the predetermined optimal amount when the droplets are arranged in the second partition regions.

In accordance with this aspect, nonuniformity of the droplet discharge amount caused by nozzle discharge characteristics can be reduced and a uniform film layer can be formed because the discharge amount is adjusted for each nozzle based on the discharge characteristics (distribution of the discharge amount) of the nozzles. In this case, the discharge characteristics of the nozzles of each discharge pattern must be studied when the discharge pattern differs in each main scan, but in the droplet discharge device of the present invention, the movement distance of the droplet discharge head in the sub-scanning direction in the first discharge region is an integral multiple of the arrangement interval in the sub-scanning direction of the first partition region. Therefore, the spatial arrangement between the nozzles and the first partition region is constantly equal, and the discharge pattern does not vary. In other words, the combination of nozzles (i.e., the combination of discharge nozzles and non-discharge nozzles) in the portions lying over a plurality of first partition regions among the plurality of nozzles provided to the droplet discharge head remains constant. Accordingly, the discharge characteristics of the nozzles to be measured in advance may be determined using only a single type of discharge pattern for each droplet discharge head, the measurement time is reduced, and drive control is facilitated. The uniformity of the discharge amount is dramatically increased because the discharge amount is controlled based on the discharge characteristics of the discharge pattern used for actual discharges.

In the second discharge region, the movement distance in the sub-scanning direction of the droplet discharge head is not an integral multiple of the arrangement interval in the sub-scanning direction of the second partition region. Therefore, the spatial arrangement between the nozzles and the second partition region generally changes for each main scan and the discharge pattern also changes in accordance therewith. Accordingly, in the present invention, when droplets are to be discharged onto the second discharge region, those among the plurality of nozzles lying over the second partition region are selected for each main scan, the droplets are discharged from the selected nozzles, and the drive waveforms of the plurality of drive elements are controlled based on the distribution of the average droplet discharge amount in each combination measured in advance for all combinations of selectable nozzles, so that the discharge amount of the droplets discharged from the plurality of nozzles approximates the predetermined optimal amount. In accordance with this method, although the discharge pattern, which is a combination of discharge nozzles and non-discharge nozzles, is different for each main scan, the discharge characteristics of nozzles measured in advance may be a single discharge characteristic. Therefore, drive control is made simpler than with the case in which the discharge characteristics are measured for each and every discharge pattern and the drive waveforms of the drive elements are calculated for each discharge pattern based on the discharge characteristics.

Examples of the method for measuring the distribution of the average droplet discharge amount in each combination include a method for measuring the distribution of the discharge amounts for all selectable nozzle combinations and calculating the arithmetic mean of the distributions. Also possible is a method for calculating the distribution of the arithmetic means, in which droplets from the plurality of nozzles of each combination are discharged in an overlapping manner on the same recording medium, the total amount is calculated for each nozzle, the value obtained by dividing the total amount by the number of deposited droplets is used as the arithmetic mean, and the arithmetic mean is calculated for each nozzle. For example, there is also method in which droplets from the plurality of nozzles of a first combination are discharged, droplets from the plurality of nozzles of a second combination are thereafter discharged in an overlapping manner, and the average (arithmetic mean) of the total amounts is measured for each nozzle and used as the distribution of the discharge amounts of the nozzles.

In the case that the distribution of the discharge amount of each nozzle is calculated using such a method, the combination of the plurality of nozzles used in the measurement of the distribution of the discharge amounts is a combination of nozzles which are all used for actual discharge. For this reason, a distribution that approximates the distribution of the discharge amounts of the discharge pattern used for actual discharges can be obtained. Accordingly, when the discharge amount of each nozzle is adjusted based on the distribution of such discharge amounts, the uniformity of the discharge amounts will not be compromised to a greater degree than with the case in which the discharge amounts are adjusted based on the distribution of the discharge amounts of the discharge pattern used for actual discharges.

The droplet discharge device preferably further includes a discharge amount measuring device having a recording medium onto which droplets are discharged from the nozzles, and an image-capturing device configured and arranged to capture an image of the droplets discharged onto the recording medium. The control unit is preferably further configured to process the image of the droplets captured by the image-capturing device, to calculate a surface area over which each of the droplets is deposited on the recording medium, and to calculate the distribution of the droplet discharge amount of each of the nozzles based on the surface area.

In accordance with this aspect, the discharge amounts of the droplets discharged from the plurality of nozzles can be measured simultaneously. Therefore, the time required for measurement can be much smaller than with conventional methods in which the discharge amounts are measured for each nozzle using, e.g., an electronic scale.

In the droplet discharge device, the recording medium is preferably a flexible sheet member having a porous ink-receiving layer in which pigments are bound by a binder, and the discharge amount measuring device preferably includes a feed reel configured and arranged to feed the recording medium, and a take-up reel configured and arranged to take up the recording medium fed from the feed reel.

In accordance with this aspect, the discharge amount can be measured in a simple manner at low cost because widely used roll paper for photograph printing may be used as the recording medium. Since the recording medium is fed by the feed reel and taken up by the take-up reel, high precision measurement can be constantly carried out using a new recording medium for each measurement. In this case, the sheet member is a consumable item, but in the droplet discharge device of the present invention, the discharge amount can be measured using a single discharge pattern established for each droplet discharge head. Therefore, the amount of sheet member required for measurement can be reduced and higher costs can be kept to a minimum.

In the droplet discharge device, the control unit preferably includes a drive signal selection section configured to select and feed one type among a plurality of types of drive signals to each of the drive elements, a first storage section configured to store drive signal selection data indicative of correspondence between each of the drive elements and the type of drive signal fed to the drive element, a second storage section configured to store waveform data of the plurality of types of drive signals, and a drive signal generation section configured to acquire the waveform data of the plurality of types of drive signals from the second storage section and to generate the plurality of types of drive signals based on the waveform data. The drive signal selection section is preferably configured to select the type of drive signal fed to the drive element among the drive signals generated by the drive signal generation section, based on the drive signal selection data stored in the first storage section.

In accordance with this aspect, the drive signal selection data and the drive signal waveform data can be freely added, deleted, and modified, and management of these data is facilitated. It is possible to handle individual differences in droplet discharge heads using a general-purpose device configuration.

In the droplet discharge device, the first storage section is preferably configured to store discharge data indicative of correspondence between each of the drive elements and information for specifying whether or not a drive signal is to be fed to the drive element, and the control unit further preferably includes a feed switching section configured to switch between feed and non-feed of a drive signal selected by the drive signal selection section for each of the drive elements based on the discharge data.

In accordance with this aspect, the drive signal selection data can be freely added, deleted, and modified, and the management of these data is facilitated.

In the droplet discharge device, the drive signal selection section and the feed switching section of the control unit are preferably mounted to the droplet discharge head, and the first storage section, the second storage section, and the drive signal generation section of the control unit are preferably mounted to a drive circuit substrate.

In accordance with this aspect, replacement of the droplet discharge head, replacement of the drive circuit substrate, or replacement of service components and the like is facilitated and maintenance characteristics can be improved.

In the droplet discharge device, the drive signals are preferably of four types.

The number of components and the costs can thus be kept to a necessary minimum because nonuniformity of the droplet discharge amount caused by nonuniformity of the discharge characteristics of the nozzles can be reduced to a target level even in the case that the drive signal has been selected from among four types.

In the droplet discharge device, the drive elements are preferably piezoelectric elements.

Thus, droplets having an amount that corresponds to the drive signal can be discharged with high precision by using a piezoelectric element.

A method for forming a thin film according to another aspect is a method for forming a thin film by arranging droplets onto a substrate including a first discharge region having a plurality of first partition regions arranged at a first interval in a first direction and a second discharge region having a plurality of second partition regions arranged at a second interval in the first direction that is different from the first interval. The method for forming a thin film includes discharging droplets from a plurality of nozzles of a droplet discharge head at a predetermined timing while the droplet discharge head is scanned with respect to the substrate in a main scanning direction corresponding to a second direction of the substrate that is orthogonal to the first direction and a sub-scanning direction corresponding to the first direction at predetermined movement intervals so that the droplets are selectively discharged onto the first and second partition regions disposed on the substrate, with the predetermined movement interval in the sub-scanning direction being equal to an integral multiple of the first interval, and controlling drive waveforms outputted to a plurality of drive elements provided in correspondence with the nozzles so that the drive waveforms of a prescribed set of drive elements corresponding to a prescribed set of the nozzles selected to discharge droplets during a main scan when the droplets are arranged in the first partition regions are controlled based on a pre-measured distribution of a droplet discharge amount from each of the prescribed set of the nozzles so that the droplet discharge amount of each of the prescribed set of the nozzles approximates a predetermined optimal amount when the droplets are arranged in the first partition regions, and the drive waveforms of the drive elements corresponding to the nozzles included in a plurality of potential combinations of the nozzles selected to discharge droplets during a main scan when the droplets are arranged in the second partition regions are controlled based on a pre-measured distribution of an average droplet discharge amount of each of the nozzles calculated from an amount of droplets discharged from the each of the nozzles in all the potential combinations so that the droplet discharge amount of each of the nozzles approximates the predetermined optimal amount when the droplets are arranged in the second partition regions.

In accordance with this method, nonuniformity of the droplet discharge amount due to the discharge characteristics of the nozzles is reduced and a film can be formed to a uniform thickness because the discharge amount is adjusted for each nozzle based on the discharge characteristics (distribution of the discharge amounts) of the nozzles. In this case, the discharge characteristics of the nozzles must be investigated for each discharge pattern when the discharge pattern is different for each main scan. However, in the droplet discharge device of the present invention, in relation to the first discharge region, the movement distance of the droplet discharge head in the sub-scanning direction is an integral multiple of the arrangement interval in the sub-scanning direction of the first partition region. Therefore, the spatial arrangement of the nozzles and the first partition region is constantly equal, and the discharge pattern does not vary. In other words, the combination of nozzles (i.e., the combination of discharge nozzles and non-discharge nozzles) in the portions lying over a plurality of first partition regions among the plurality of nozzles provided to the droplet discharge head remains constant. Accordingly, the discharge characteristics of the nozzles to be measured in advance may be determined using only a single type of discharge pattern for each droplet discharge head, the measurement time is reduced, and drive control is facilitated. The uniformity of the discharge amount is dramatically increased because the discharge amount is controlled based on the discharge characteristics of the discharge pattern used for actual discharges.

In the second discharge region, the movement distance in the sub-scanning direction of the droplet discharge head is not necessarily an integral multiple of the arrangement interval in the sub-scanning direction of the second partition region. Therefore, the spatial arrangement between the nozzles and the second partition region generally changes for each main scan and the discharge pattern also changes in accordance therewith. Accordingly, in the present invention, when droplets are to be discharged onto the second discharge region, the nozzles lying over the second partition region are selected among the plurality of nozzles for each main scan, the droplets are discharged from the selected nozzles, and the drive waveforms of the plurality of drive elements are controlled based on the distribution of the average droplet discharge amount in each combination measured in advance for all combinations of selectable nozzles, so that the discharge amount of the droplets discharged from the plurality of nozzles approximates the predetermined optimal amount. In accordance with this method, although the discharge pattern, which is a combination of discharge nozzles and non-discharge nozzles, is different for each main scan, the discharge characteristics of nozzles measured in advance may be a single discharge characteristic. Therefore, drive control is made simpler than in the case where the discharge characteristics are measured for each and every discharge pattern and the drive waveforms of the drive elements are calculated for each discharge pattern based on the discharge characteristics.

The method for forming a thin film preferably further includes discharging droplets from the droplet discharge head onto a recording medium, capturing an image of the droplets deposited on the recording medium by an image-capturing device, measuring a surface area over which each of the droplets is deposited on the recording medium from the image of the droplets captured by the image-capturing device, and calculating the droplet discharge amount based on the surface area to determine the distribution of the droplet discharge amount of each of the nozzles.

In accordance with this method, the discharge amounts of the droplets discharged from the plurality of nozzles can be measured simultaneously. Therefore, the time required for measurement can be reduced more greatly than with conventional methods in which the discharge amounts are measured for each nozzle using, e.g., an electronic scale.

BRIEF DESCRIPTION OF THE DRAWINGS

Referring now to the attached drawings which form a part of this original disclosure:

FIG. 1 is a schematic structural view of a droplet discharge device;

FIG. 2 is a detailed descriptive view of a droplet discharge head provided to a droplet discharge device;

FIG. 6 is a descriptive view of the method for adjusting the drive voltage when nozzle duties differ;

FIG. 12 is a descriptive view showing an example of drive waveforms set for each nozzle;

FIG. 14 is a detailed descriptive view of the COM selection circuit 40;

FIG. 16 is a first timing chart showing the operation of the droplet discharge device IJ;

FIG. 18 is a descriptive view of a conventional droplet discharge step.

DETAILED DESCRIPTION OF EXEMPLARY EMBODIMENTS

Figure 3:
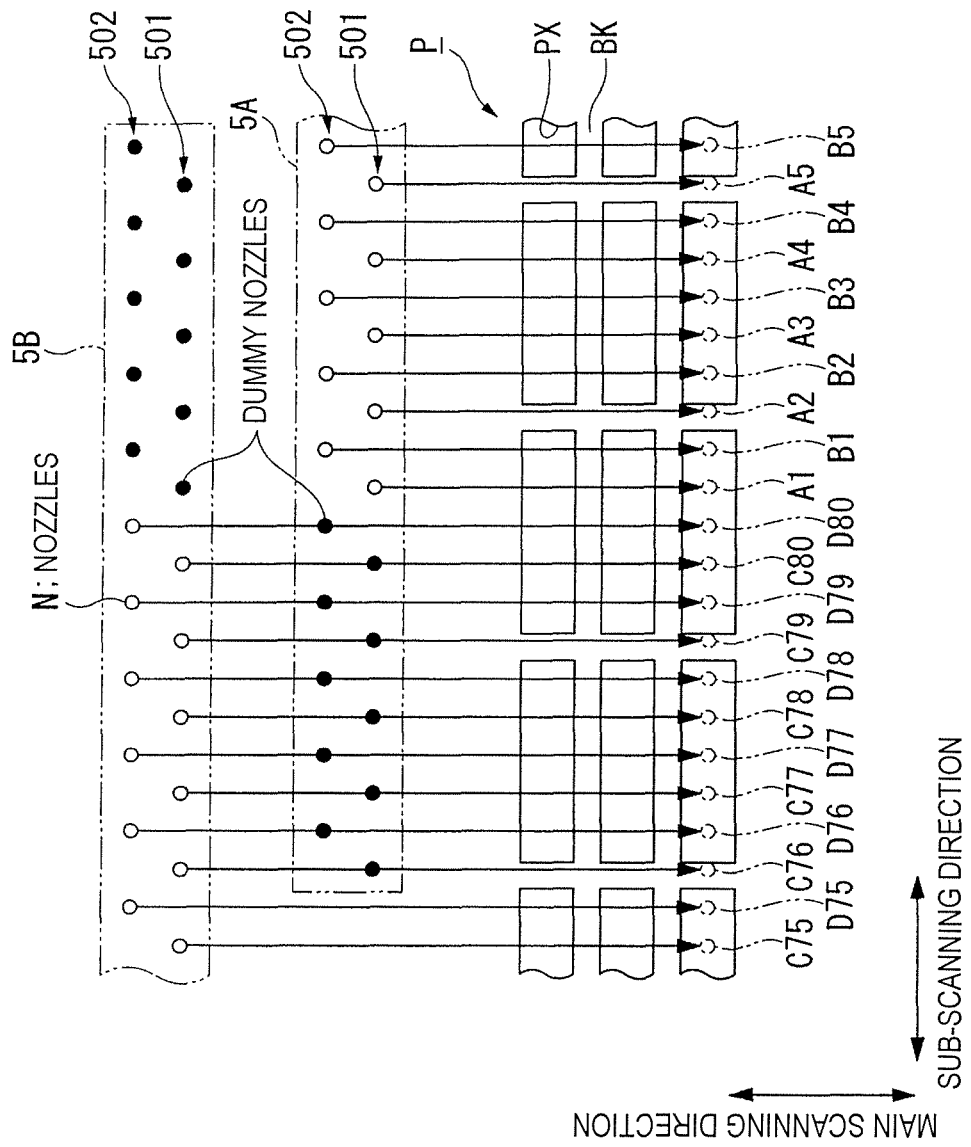
FIG. 3 is a plan view for illustrating an arrangement example and an operation example of a plurality of droplet discharge heads.

An embodiment of the present invention is described below with reference to the drawings. In the description below, an XYZ rectangular coordinate system shown in FIG. 1 is established, and the members in the description below will be described with reference to the XYZ rectangular coordinate system. The XYZ rectangular coordinate system is established so that the X- and Y-axes are set in directions parallel to the work stage 2, and the Z-axis is set in the direction orthogonal to the work stage 2. The XYZ rectangular coordinate system in FIG. 1 is established so that the XY plane is actually parallel to the horizontal plane, and the Z-axis is set in the perpendicularly upward direction.

FIG. 1 is a schematic structural view of the droplet discharge device IJ in an embodiment of the present invention. The droplet discharge device IJ of the present embodiment is a device for discharging droplets of a color filter material on a color filter substrate (discharge target) using an inkjet scheme to form a color filter layer.

The droplet discharge device IJ has a device platform 1, a work stage 2, a stage movement device 3, a carriage 4, a droplet discharge head 5, a carriage movement device 6, tubes 7, a first tank 8, a second tank 9, a third tank 10, a maintenance device 12, a discharge amount measuring device 13, and a control device (control unit) 11.

The device platform 1 is a support pedestal for the work stage 2, the maintenance device 12, a measurement stage 17, and the stage movement device 3. The work stage 2 is disposed so as to allow the stage movement device 3 on the device platform 1 to move the work stage in the X-axis direction, and holds the color filter substrate P conveyed from an upstream substrate feed device 36 (see FIG. 8) on the XY plane using a chucking mechanism. The stage movement device 3 is provided with a ball screw, a linear guide, or another bearing mechanism, and moves the work stage 2 in the X-axis direction based on stage position control signals provided by the control device 11 indicating the X-coordinate of the work stage 2.

The carriage 4 is a holder for integrally holding a plurality of droplet discharge heads 5. The carriage 4 is provided so that the carriage movement device 6 can move the carriage in the Y-axis direction and the Z-axis direction.

The droplet discharge head 5 is provided with a plurality of nozzles (not shown) and discharge droplets of color filter material based on image data and drive control signals inputted from the control device 11. The droplet discharge head 5 is provided in correspondence with the R (red), G (green), and B (blue) color filter materials, and the droplet discharge head 5 is connected to respective tubes 7 via the carriage 4. The droplet discharge head 5 that corresponds to R (red) receives a supply of R (red) color filter material from the first tank 8 via a tube 7, the droplet discharge head 5 that corresponds to G (green) receives a supply of G (green) color filter material from the second tank 9 via a tube 7, and the droplet discharge head 5 that corresponds to B (blue) receives a supply of B (blue) color filter material from the third tank 10 via a tube 7.

The carriage movement device 6 has a bridge structure straddling the device platform 1, is provided with a ball screw, a linear guide, or another bearing mechanism in relation to the Y-axis direction and the Z-axis direction, and moves the work stage 2 in the Y-axis direction and the Z-axis direction based on carriage position control signals provided by the control device 11 indicating the Y- and Z-coordinates of the carriage 4.

The tubes 7 are tubes for feeding color filter material and are connected to the first tank 8, the second tank 9, the third tank 10, and the carriage 4 (droplet discharge head 5). The first tank 8 stores R (red) color filter material and feeds the color filter material to the droplet discharge head 5 that corresponds to R (red) via a tube 7. The second tank 9 stores G (green) color filter material and feeds the color filter material to the droplet discharge head 5 that corresponds to G (green) via a tube 7. The third tank 10 stores B (blue) color filter material and feeds the color filter material to the droplet discharge head 5 that corresponds to B (blue) via a tube 7.

The maintenance device 12 is provided with a maintenance stage that can be moved in the X-axis direction by a stage movement device (not shown), and a cleaning device, a capping device, a flushing device, and the like disposed on the maintenance stage.

The discharge amount measuring device 13 is provided with a measurement stage 14, a housing member 15 for storing a strip-shaped sheet member 16 disposed on the measurement stage 14, and an image-capturing device 17 for capturing a recording surface 16a of the sheet member 16 exposed from the housing member 15.

The measurement stage 14 is disposed so as to be capable of being moved by the stage movement device 3 in the X-axis direction on the device platform 1. The stage movement device 3 moves the measurement stage 14 in the X-axis direction based on the stage position control signal inputted from the control device 11 indicating the X-coordinate of the measurement stage 14.

The sheet member 16 has a recording surface 16a that can be moved in a relative fashion in the Y direction (the sub-scanning direction of the droplet discharge head 5) in relation to the nozzle surface of the droplet discharge head 5 in a state facing the droplet discharge head 5. A conveyance mechanism (not shown) for conveying the recording surface 16a of the sheet member 16 is accommodated together with the sheet member 16 in the housing member 15. At least a portion of the sheet member 16 is exposed through an aperture (not shown) formed in the upper surface of the housing member 15 facing the droplet discharge head 5 and is arranged so as to face the nozzle surface of the droplet discharge head 5.

The sheet member 16 is a recording medium (measurement member) on which the discharge amount and deposit position of the droplets discharged from the nozzles of the droplet discharge head 5 can be recorded. For example, roll paper or another recording paper can be used as the sheet member 16.

In the present embodiment, the sheet member 16 is a sheet having an ink-receiving layer provided to a plastic film. The ink-receiving layer is composed of a plurality of pigments and binders. The pigments are contained in the binders. The ink-receiving layer has a porous structure having numerous spaces between the plurality of binders 52.

Examples of organic pigments that can be used in the ink-receiving layer include light calcium carbonate, heavy calcium carbonate, magnesium carbonate, kaolin, talc, calcium sulfate, barium sulfate, titanium dioxide, zinc oxide, zinc sulfide, zinc carbonate, satin white, aluminum silicate, diatom earth, calcium silicate, magnesium silicate, synthetic amorphous silica, colloidal silica, alumina, and alumina hydrate, aluminum hydroxide, lithopone, zeolite, hydrous halloysite, magnesium hydroxide and other white inorganic pigments, styrene-based plastic pigment, acrylic plastic pigment, polyethylene, microcapsules, and urea resin, and melamine resin. One of the above may be used alone, or two or more may be used in combination in the ink-receiving layer.

The binder contained in the ink-receiving layer as the pigment binding material may include a water-soluble or water-insoluble polymeric compound having affinity with ink. Examples of the water-soluble polymeric compound include methyl cellulose, methyl hydroxyethyl cellulose, methyl hydroxypropyl cellulose, hydroxy ethyl cellulose, and other cellulose-based adhesives materials; starches and modifications thereof; gelatins and modifications thereof; casein, pullulan, gum Arabic, albumin, and other natural polymer resins and derivatives thereof; polyvinyl alcohol and modifications thereof; styrene-butadiene copolymers, styrene-acrylic copolymers, methyl methacrylate-butadiene copolymers, ethylene-vinyl acetate copolymers, and other latexes or emulsions; polyacrylamides, polyvinyl pyrrolidone, and other vinyl polymers; polyethyleneimine, polypropylene glycol, polyethylene glycol, maleic anhydride, and copolymers thereof.

Examples of the water-insoluble compound include ethanol, 2-propanol, or another alcohol; and water-insoluble adhesives dissolved in a mixed solution of water and the above-noted alcohols. Examples of such a water-insoluble adhesive include vinyl pyrrolidone/vinyl acetate copolymer, polyvinyl butyral, polyvinyl formal, and other acetal resins.

The conveyance mechanism has, e.g., a feed reel for feeding the sheet member 16, a take-up reel for taking up the sheet member 16 fed from the feed reel, and a rotating motor or another actuator for rotating the feed reel and the take-up reel; and is configured so that the control device 11 controls the actuator to thereby convey the sheet member 16 from the feed reel to the take-up reel.

The image-capturing device 17 captures an image of the film of the droplet deposited on the recording surface 16a. The image-capturing device 17 is disposed so that an image-capturing device movement device 18 (see FIG. 8) can move the image-capturing device in the Y-axis direction above the measurement stage 14. A CCD camera or the like that can capture an image of the droplet film deposited on the recording surface 16a at a predetermined resolution can be used for the image-capturing device 17.

The control device 11 outputs a stage position control signal to the stage movement device 3, outputs a carriage position control signal to the carriage movement device 6, outputs drawing data and drive control signals to the drive circuit substrate 30 (see FIG. 8) of the droplet discharge head 5, and carries out synchronizing control of the droplet discharge operation by the droplet discharge head 5, the operation for positioning the color filter substrate P via the movement of the work stage 2, and the operation for positioning the droplet discharge head 5 via the movement of the carriage 4, whereby droplets of the color filter material are discharged in predetermined positions on the color filter substrate P.

In the case that the discharge amount and accuracy with which the droplets are deposited from the nozzles of the droplet discharge head 5 are measured using the discharge amount measuring device 13; the control device 11 outputs a stage position control signal to the stage movement device 3, outputs a carriage position control signal to the carriage movement device 6, outputs drawing data and drive control signals for measurement to the drive circuit substrate 30 (see FIG. 8) of the droplet discharge head 5, and carries out synchronizing control of the droplet discharge operation performed by the droplet discharge head 5, the operation for positioning the recording surface 16a of the sheet member 16 via the movement of the measurement stage 14, and the operation for positioning the droplet discharge head 5 via the movement of the carriage 4, whereby droplets of color filter material are discharged in predetermined positions on the recording surface 16a of the sheet member 16

The control device 11 outputs an image-capturing device position control signal to the image-capturing device movement device 18 (see FIG. 8), and moves the image-capturing device 17 above the recording surface 16a of the sheet member 16 on which droplets have been deposited. An image-capturing device drive control signal is outputted to an image-capturing device drive device 19 (see FIG. 8), the imaging operation of the image-capturing device 17 is controlled to capture an image of the film of the droplets deposited on the recording surface 16a and formed into a film by a drying process, and the image data is outputted to a discharge amount measurement computation unit 41 (see FIG. 8) and to a display 38 (see FIG. 8). The droplet deposition accuracy is measured and the discharge amount per droplet is measured from the surface area of the droplet film by image processing carried out by the discharge amount measurement computation unit 41.

When measurement has ended, the recording surface 16a of the portion on which droplets have been deposited is conveyed into the housing member 15 by the conveyance mechanism, and a new recording surface is exposed to the exterior through the housing member 15.

FIG. 2 is a schematic structural view of a droplet discharge head 5. FIG. 2(a) is a plan view of the droplet discharge head 5 as seen from the work stage 2 side; FIG. 2(b) is a partial perspective view of the droplet discharge head 5; and FIG. 2(c) is a partial cross-sectional view of a single nozzle of the droplet discharge head 5.

The droplet discharge head 5 is provided with a plurality of (e.g., 180) nozzles $N_1$ to $N_{180}$ arranged in the Y-axis direction, as shown in FIG. 2(a). In FIG. 2(a), an example is shown in which a single row of nozzles arranged in the Y-axis direction (sub-scanning direction) is provided as two rows arranged in the X-axis direction (main scanning direction) and the two rows of nozzles are arranged so as to be offset in the Y-axis direction by a half nozzle interval, but it is also possible to arbitrarily modify the number of nozzles provided to the droplet discharge head 5, and the single row of nozzles arranged in the Y-axis direction may be a single row, or three or more rows provided in the X-axis direction. In the case that a plurality of rows of nozzles is provided, the configuration is preferably one in which the nozzle rows are arranged in an offset manner in the sub-scanning direction and the dischargeable ranges of the rows complement each other. The number of droplet discharge heads 5 disposed in the carriage 4 may be arbitrarily modified. Also possible is a configuration in which a plurality of carriages 4 is provided in sub carriage units.

The droplet discharge head 5 has a vibration plate 20 provided with a material feed hole 20a connected to the tube 7, a nozzle plate 21 provided with the nozzles $N_1$ to $N_{180}$, a liquid reservoir 22 provided between the vibration plate 20 and the nozzle plate 21, a plurality of partition walls 23, and a plurality of cavities (fluid chambers) 24, as shown in FIG. 2(b). Piezoelectric elements (drive elements) $PZ_1$ to $PZ_{180}$ are arranged on the vibration plate 20 in correspondence with the nozzles $N_1$ to $N_{180}$. The piezoelectric elements $PZ_1$ to $PZ_{180}$ are, e.g., piezoelements.

The liquid reservoir 22 is filled with a liquid color filter material fed via the material feed hole 20a. The cavities 24 are formed so as to be enclosed by the vibration plate 20, a nozzle plate 21, and a pair of partition walls 23, and are provided in one-to-one correspondence to the nozzles $N_1$ to $N_{180}$. The color filter material is introduced from the liquid reservoir 22 into the cavities 24 via a feed port 24a disposed between the pair of partition walls 23.

The piezoelectric element $PZ_1$ has a piezoelectric material 25 held between a pair of electrodes 26 and is configured so that the piezoelectric material 25 contracts when a drive signal is applied to the pair of electrodes 26. The vibration plate 20 in which such a piezoelectric element $PZ_1$ is arranged is designed to simultaneously flex outward (the side opposite from the cavities 24) in integral fashion with the piezoelectric element $PZ_1$, whereby the volume of the cavities 24 increases. Therefore, the color filter material commensurate with the increased volume flows into the cavities 24 from the liquid reservoir 22 via the feed port 24a. When the application of a drive signal to the piezoelectric element $PZ_1$ is stopped in such a state, the piezoelectric element $PZ_1$ and the vibration plate 20 return to their original shapes and the volume of the cavities 24 is also restored. Therefore, the pressure of the color filter material inside the cavities 24 increases and a droplet L of the color filter material is discharged from the nozzle $N_1$ toward the color filter substrate P.

FIG. 3 is a plan view showing an arrangement example and an operation example of a plurality of droplet discharge heads 5 provided to a single carriage. In order to simplify the drawing in FIG. 3, only two droplet discharge heads 5A, 5B among the plurality of droplet discharge heads held by the carriage are enlarged to show the arrangement example and the operation example.

The droplet discharge heads 5A, 5B are mutually offset in position in the sub-scanning direction (Y-axis direction), and the dischargeable ranges of the two complement each other. The droplet discharge heads 5A, 5B mutually complement the dischargeable range and thereby constitute a single head unit. A plurality of the droplet discharge heads 5A, 5B constituting the head unit constitute an integral unit and discharge a plurality of droplets onto a plurality of partition regions PX arrayed in the sub-scanning direction.

The plurality of nozzles N in the droplet discharge heads 5A, 5B are arranged in a linear fashion at a predetermined pitch (e.g., 90 dpi) and constitute nozzle rows 501, 502. The direction in which the nozzles N are aligned in the nozzle rows 501, 502 matches the sub-scanning direction, and the nozzles N of the nozzle rows 501, 502 are in a mutual relationship that forms a staggered arrangement.

When the droplet discharge heads 5A, 5B are scanned in the main scanning direction in relation to the color filter substrate P, the nozzles N draw a continuous scan trace at a predetermined pitch (e.g., 180 dpi) on the color filter substrate P. In this case, in view of their unique characteristics, several nozzles N (five, in the present embodiment) at the end parts of the nozzle rows 501, 502 are unused dummy nozzles (illustrated as filled circles) and are in a relationship in which the scan region of the dummy nozzles of the droplet discharge head 5A is complemented by the nozzles N of the droplet discharge head 5B, and the scan region of the dummy nozzle of the droplet discharge head 5B is complemented by the nozzles N of the droplet discharge head 5A.

A bank BK that delineates the partition regions PX corresponding to the pixel regions is formed in advance using a photosensitive resin or the like on the color filter substrate P. The bank BK is disposed upright on the color filter substrate P so as to surround the periphery of the partition regions PX, and a color filter is formed on the partition regions PX by discharging ink; i.e., color filter material, into the region surrounded by the bank BK. In this case, the scan trace involves nozzles N that can pass over the partition regions PX and nozzles N that cannot pass over the partition regions PX, and the arrangement of ink in the partition regions PX is carried out by discharging ink from the nozzles N that can pass over the partition regions PX.

The reference numerals A1 to A5, B1 to B5, C75 to C80, and D75 to D80 assigned to the nozzles N refer to the nozzle numbers of the nozzle row 501 of the droplet discharge head 5A, the nozzle row 502 of the droplet discharge head 5A, the nozzle row 501 of the droplet discharge head 5B, and the nozzle row 502 of the droplet discharge head 5B, respectively. As used herein, the nozzle numbers are serial numbers indicating the arrangement sequence of the nozzles N in the alignment direction of the nozzle rows 501, 502. In the present embodiment, a single nozzle row may be indicated by nozzle numbers excluding the dummy nozzles.

The nozzles N having the nozzle numbers D79, C80, D80, A1, and B1 can discharge ink in the same partition regions PX in suitable intervals during the scan. The nozzles N having the nozzle numbers C76, C79, A2, and A5 have a scan trace that passes over the bank BK, and is therefore not discharged in all intervals during the scan. Discharge/non-discharge control for each of such nozzles is carried out by switching the drive signal feed to the corresponding piezoelectric elements.

Figure 4:
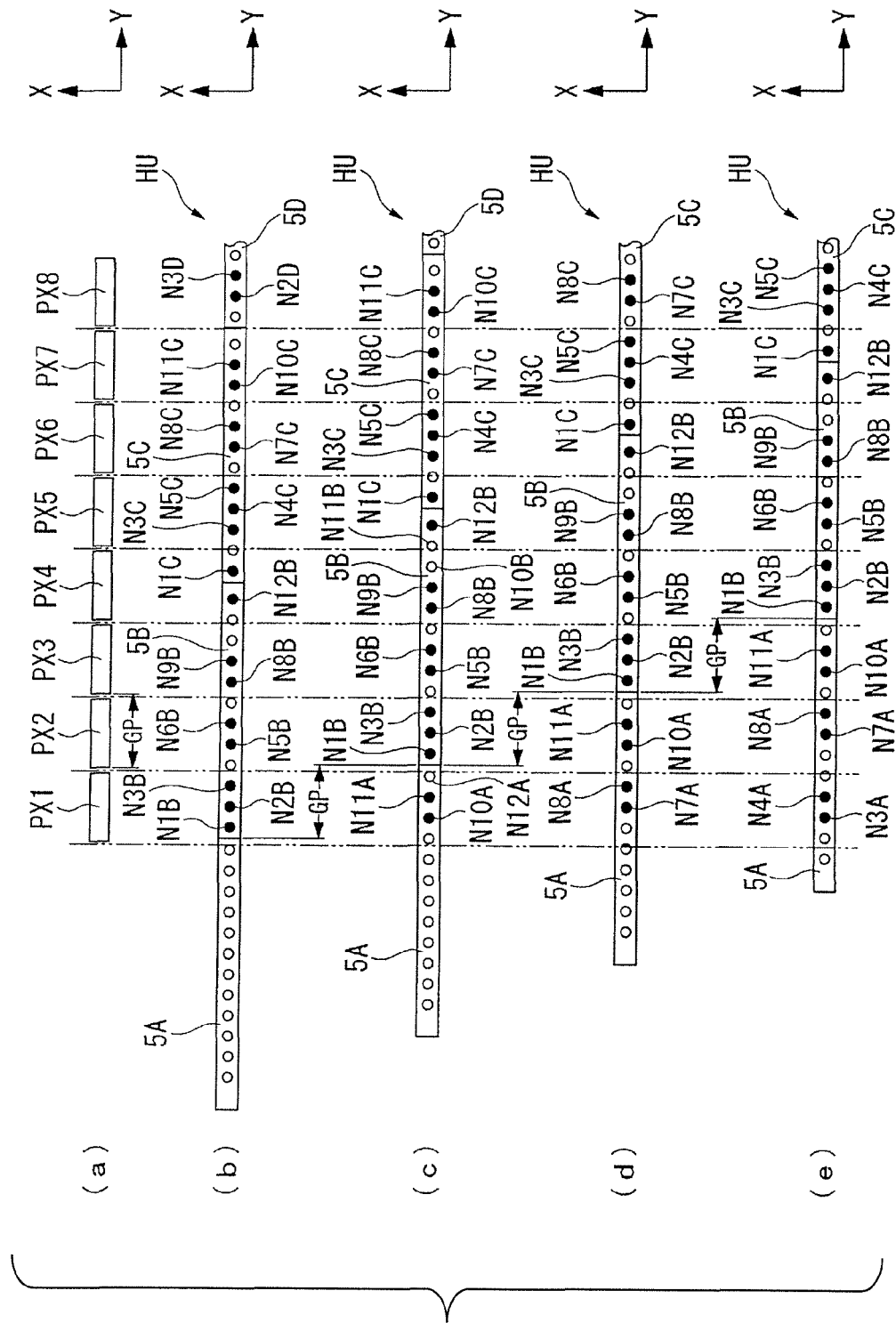
FIG. 4 is a plan view for describing the discharge operation of the droplet discharge head.

FIG. 4 is a plan view for describing the scan method of the droplet discharge head. FIG. 4(a) is a plan view of a single row of partition regions PX arranged in the sub-scanning direction; and FIGS. 4(b) through 4(d) are plan views showing the arrangement of the discharge nozzles (nozzles for discharging droplets in the partition regions PX) in the first to fourth main scan. In FIGS. 4(b) through 4(d), the number of nozzles of a single droplet discharge head is set to 12, dummy nozzles have been omitted, and a plurality of droplet discharge heads is rectilinearly displayed in order to simplify the drawings. The plurality of rectilinearly arranged droplet discharge heads constitutes a single head unit HU. In the drawings, the discharge nozzles are filled in and the non-discharge nozzles are not filled in.

A head unit HU is provided with four droplet discharge heads 5A, 5B, 5C, 5D, as shown in FIGS. 4(b) through 4(d). A total of 48 nozzles N are provided to the four droplet discharge heads 5A, 5B, 5C, 5D, and these 48 nozzles N integrally form a single nozzle row extending in the sub-scanning direction. Partition regions PX1 to PX8 are arrayed at a constant interval GP in the Y-axis direction (sub-scanning direction), four main scans are carried out in a single partition region PX, and a total of nine droplets are discharged.

In the first main scan cycle (first main scan), droplets are discharged from the nozzles N1B, N2B, N3B, N5B, N6B, N8B, N9B, N12B of the droplet discharge head 5B, the nozzles N1C, N3C, N4C, N5C, N7C, N8C, N10C, N11C of the droplet discharge head 5C, and the nozzles N2D, N3D of the droplet discharge head 5D, as shown in FIG. 4(b). The droplets discharged from the nozzles N1B, N2B, N3B of the droplet discharge head 5B are deposited in the partition region PX1; the droplets discharged from the nozzles N5B, N6B of the droplet discharge head 5B are deposited in the partition region PX2; the droplets discharged from the nozzles N8B, N9B of the droplet discharge head 5B are deposited in the partition region PX3; the droplets discharged from the nozzle N12B of the droplet discharge head 5B and the nozzle N1C of the droplet discharge head 5C are deposited in the partition region PX4; the droplets discharged from the nozzles N3C, N4C, N5C of the droplet discharge head 5C are deposited in the partition region PX5; the droplets discharged from the nozzles N7C, N8C of the droplet discharge head 5C are deposited in the partition region PX6; the droplets discharged from the nozzles N10C, N11C of the droplet discharge head 5C are deposited in the partition region PX7; and the droplets discharged from the nozzles N2D, N3D of the droplet discharge head 5D are deposited in the partition region PX8.

When the first main scan cycle has ended, a sub-scan is performed and a second main scan cycle (second main scan) is carried out, as shown in FIG. 4(c). The sub-scan is carried out by moving the head unit HU from the first main scan cycle position in the Y-axis direction by a distance equal to the arrangement interval GP in the Y-axis direction of the partition regions PX.

The movement distance of the sub-scan is ordinarily designed to be an integral multiple of the interval between the nozzles of the droplet discharge head 5, but in this case, the arrangement interval GP of the partition regions PX generally does not end up being an integral multiple of the interval between the nozzles. Therefore, the spatial arrangement between the nozzles N and the partition regions PX differs for each main scan. As a result, the discharge pattern is different in each main scan and the discharge characteristics of the nozzles N will also vary.

In contrast, in the droplet discharge device of the present embodiment, the movement distance in the sub-scan is an integral multiple of the arrangement interval of the partition regions PX. Therefore, the spatial arrangement between the nozzles N of the droplet discharge head 5 and the partition regions PX is equal in all main scans. In other words, among the plurality of nozzles provided to the droplet discharge head, the arrangement of the discharge nozzles and the non-discharge nozzles is constant in the overlapping portions with the panel region composed of a plurality of partition regions PX. As a result, the arrangement (discharge pattern) of the nozzles N that perform discharges in the droplet discharge head 5 is fixed and stable discharge operations can be carried out in a constant manner.

In the second main scan cycle, droplets are discharged from the nozzles N10A, N11A of the droplet discharge head 5A, the nozzles N1B, N2B, N3B, N5B, N6B, N8B, N9B, N12B of the droplet discharge head 5B, and the nozzles N1C, N3C, N4C, N5C, N7C, N8C, N10C, N11C of the droplet discharge head 5C. The droplets discharged from the nozzles N10A, N11A of the droplet discharge head 5A are deposited in the partition region PX1; the droplets discharged from the nozzles N1B, N2B, N3B of the droplet discharge head 5B are deposited in the partition region PX2; the droplets discharged from the nozzles N5B, N6B of the droplet discharge head 5B are deposited in the partition region PX3; the droplets discharged from the nozzles N8B, N9B of the droplet discharge head 5B are deposited in the partition region PX4; the droplets discharged from the nozzle N12B of the droplet discharge head 5B and the nozzle N1C of the droplet discharge head 5C are deposited in the partition region PX5; the droplets discharged from the nozzles N3C, N4C, N5C of the droplet discharge head 5C are deposited in the partition region PX6; the droplets discharged from the nozzles N7C, N8C of the droplet discharge head 5C are deposited in the partition region PX7; and the droplets discharged from the nozzles N10C, N11C of the droplet discharge head 5C are deposited in the partition region PX8.

When the second main scan cycle has ended, a sub-scan is performed and a third main scan cycle (third main scan) is carried out, as shown in FIG. 4(d). The sub-scan is carried out by moving the head unit HU from the second main scan cycle position in the Y-axis direction by a distance equal to the arrangement interval GP in the Y-axis direction of the partition regions PX.

In the third main scan cycle, droplets are discharged from the nozzles N7A, N8A, N10A, N11A of the droplet discharge head 5A, the nozzles N1B, N2B, N3B, N5B, N6B, N8B, N9B, N12B of the droplet discharge head 5B, and the nozzles N1C, N3C, N4C, N5C, N7C, N8C of the droplet discharge head 5C. The droplets discharged from the nozzles N7A, N8A of the droplet discharge head 5A are deposited in the partition region PX1; the droplets discharged from the nozzles N10A, N11A of the droplet discharge head 5A are deposited in the partition region PX2; the droplets discharged from the nozzles N1B, N2B, N3B of the droplet discharge head 5B are deposited in the partition region PX3; the droplets discharged from the nozzles N5B, N6B of the droplet discharge head 5B are deposited in the partition region PX4; the droplets discharged from the nozzles N8B, N9B of the droplet discharge head 5B are deposited in the partition region PX5; the droplets discharged from the nozzle N12B of the droplet discharge head 5B and the nozzle N1C of the droplet discharge head 5C are deposited in the partition region PX6; the droplets discharged from the nozzles N3C, N4C, N5C of the droplet discharge head 5C are deposited in the partition region PX7; and the droplets discharged from the nozzles N7C, N8C of the droplet discharge head 5C are deposited in the partition region PX8.

When the third main scan cycle has ended, a sub-scan is performed and a fourth main scan cycle (fourth main scan) is carried out, as shown in FIG. 4(e). The sub-scan is carried out by moving the head unit HU from the third main scan cycle position in the Y-axis direction by a distance equal to the arrangement interval GP in the Y-axis direction of the partition regions PX.

In the fourth main scan cycle, droplets are discharged from the nozzles N3A, N4A, N7A, N8A, N10A, N11A of the droplet discharge head 5A, the nozzles N1B, N2B, N3B, N5B, N6B, N8B, N9B, N12B of the droplet discharge head 5B, and the nozzles N1C, N3C, N4C, N5C of the droplet discharge head 5C. The droplets discharged from the nozzles N3A, N4A of the droplet discharge head 5A are deposited in the partition region PX1; the droplets discharged from the nozzles N7A, N8A of the droplet discharge head 5A are deposited in the partition region PX2; the droplets discharged from the nozzles N10A, N11A of the droplet discharge head 5A are deposited in the partition region PX3; the droplets discharged from the nozzles N1B, N2B, N3B of the droplet discharge head 5B are deposited in the partition region PX4; the droplets discharged from the nozzles N5B, N6B of the droplet discharge head 5B are deposited in the partition region PX5; the droplets discharged from the nozzles N8B, N9B of the droplet discharge head 5B are deposited in the partition region PX6; the droplets discharged from the nozzle N12B of the droplet discharge head 5B and the nozzle N1C of the droplet discharge head 5C are deposited in the partition region PX7; and the droplets discharged from the nozzles N3C, N4C, N5C of the droplet discharge head 5C are deposited in the partition region PX8.

In this manner, in the fourth main scan cycle, the nozzles N (discharge nozzles) that perform discharges in the droplet discharge heads 5A to 5D are fixed. A combination of the nozzles (discharge nozzles) that perform a discharge and the nozzles (non-discharge nozzles) that do not perform a discharge in a single droplet discharge head is referred as a "discharge pattern," and the discharge pattern remains constant except for the case of the droplet discharge head arranged at the two ends of a continuous plurality of partition regions PX.

In the present specification, the phrase "the discharge pattern is fixed" may refer to a fixed arrangement of the discharge nozzles and the non-discharge nozzles among the plurality of nozzles provided to the droplet discharge head in the portions that overlap the panel region (discharge target region) composed of a plurality of partition regions PX, and in terms of this definition, the discharge pattern of the droplet discharge heads 5A to 5D remains fixed in the example of FIG. 4.

When the discharge pattern is constant in this manner, the effect that the nozzles N have on each other due to the drive state of adjacent nozzles N is also constant. Accordingly, fluctuations in the discharge amount due to fluctuations in the drive state of adjacent nozzles N substantially do not occur, and there is no longer a necessity to adjust the drive conditions of the nozzles N for each main scan. Therefore, the drive conditions can be made constant for all main scans and drive control is considerably simplified. For example, in the droplet discharge device of the present embodiment, the discharge amount is adjusted for each nozzle based on the discharge characteristics (distribution of the discharge amount) of the nozzles in order to make the discharge amount of the nozzles more uniform, but in this case, the discharge characteristics of the nozzles must be investigated for each discharge pattern when the discharge pattern is different for each main scan. However, when the discharge pattern is always constant as described above, the discharge characteristics of the nozzles to be measured in advance may be determined using only a single type of discharge pattern, the measurement time is reduced, and drive control is facilitated.

Figure 5:
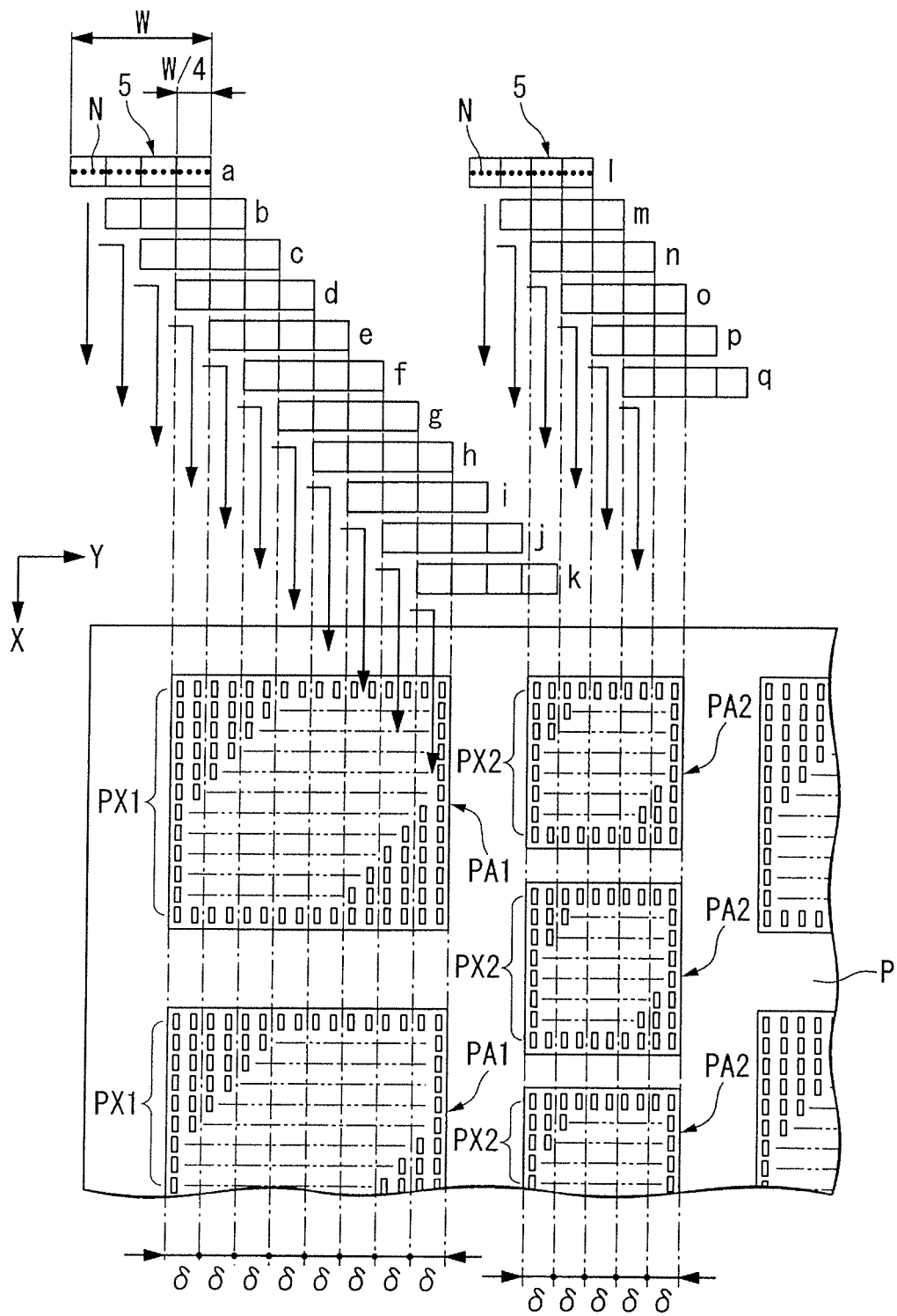
FIG. 5 is a descriptive view of the method for scanning the droplet discharge head in all panel regions.

FIG. 5 is a descriptive view of the case in which the entire area of the plurality of panel regions PA1, PA2 is scanned by a plurality of main scans. In FIG. 5, the reference numeral P is a large color filter substrate having a plurality of color filter substrates.

The plurality of types of panel regions PA1, PA2 for different models is provided to the large color filter substrate P. A plurality of partition regions PX1, PX2 is arranged at predetermined intervals in the X direction and the Y direction on the panel regions PA1, PA2, respectively. The first partition region PX1 of the first panel region (first discharge region) PAI and the second partition region PX2 of the second panel region PA2 have mutually different arrangement intervals of the partition regions. Specifically, the arrangement interval in the main scanning direction and the sub-scanning direction of the second partition region PX2 of the second panel region PA2 is less than the arrangement interval in the main scanning direction and the sub-scanning direction of the partition region PX1 of the first panel region PAI.

After the color filter layer has been formed, the large color filter substrate P is divided into a plurality of small color filter substrates. A plurality of panel regions PA1, PA2 that correspond to the divided small color filter substrates is provided on the large color filter substrate P.

In FIG. 5, the size of the droplet discharge head 5, the size of the partition regions PX, and the size of the panel regions PA are different from their actual sizes in order to facilitate understanding.

In FIG. 5, the droplet discharge head 5 carries out the following operations. First, the droplet discharge head 5 selectively discharges ink; i.e., color filter material, from the plurality of nozzles N in the interval of the main scan movement while repeating scan movement in the main scanning direction (X-axis direction), return movement to the initial position, and sub-scan movement in the sub-scanning direction (Y-axis direction), from the initial position (a) to the end position (k) in the first panel region PA1. The color filter material is thereby deposited in each of the first partition regions PX1 in the first panel region PA1 of the large color filter substrate P.

Next, the droplet discharge head 5 is sub-scanned and moved in the sub-scanning direction for a single cycle or a plurality of cycles and selectively discharges ink; i.e., color filter material, from the plurality of nozzles N in the interval of the main scan movement while repeating scan movement in the main scanning direction (X-axis direction), return movement to the initial position, and sub-scan movement in the sub-scanning direction (Y-axis direction), from the initial position (1) to the end position (q) in the second panel region PA2. The color filter material is thereby deposited in each second partition region PX2 in the second panel region PA2 of the large color filter substrate P.

The movement distance 8 of the sub-scan is an integral multiple of the arrangement interval in the sub-scanning direction of the first partition region PX1. For example, when the movement distance δ is ¼ the width W of the nozzle row of the droplet discharge head 5, the discharge pattern is constantly fixed from the fourth main scan (d) to the eighth main scan (h) in which the entire nozzle row of the droplet discharge head 5 overlaps the first panel region PA1. However, the end parts of the nozzle row do not discharge in the first main scan (a) to the third main scan (c) and from the ninth main scan (i) to the eleventh main scan (k) in which the nozzle row of the droplet discharge head 5 only overlaps a portion of the first panel region PA1. The discharge pattern of the end parts is different from the discharge pattern from the fourth main scan (d) to the eighth main scan (h)

In this case, the ratio of the number of nozzles (number of discharge nozzles/total number of nozzles excluding dummy nozzles) that discharge in the droplet discharge head 5; i.e., the nozzle duty, is different in the fourth main scan (d) to the eighth main scan (h), and in the first main scan (a) to the third main scan (c) as well as the ninth main scan (i) to the eleventh main scan (k). As a result, the discharge amount is reduced as the nozzle duty decreases due to the effect of electrical crosstalk.

In other words, a rectangular wave or a trapezoidal wave is ordinarily used as the drive signal fed to the nozzles, but when nozzle duty increases and the drive voltage increases, the rise portion or the fall portion of the drive voltage is overshot or undershot and the actual value of the drive voltage varies. Such variation of the actual value of the drive voltage affects the discharge amount of the fluid, and the thickness of the film becomes nonuniform.

In view of the above, in the present embodiment, the voltage value of the drive waveform is made to vary in accordance with the nozzle duty, as shown in FIG. 6(a). Since the nozzle duty and the discharge amount are substantially in a proportional relationship, the drive voltage is adjusted so as to achieve the relationship V1>V2>V3>V4, where V1 (nozzle duty: 25%) is the drive voltage of the first main scan (a) and the eleventh main scan (k), V2 (nozzle duty: 50%) is the drive voltage of the second main scan (b) and the tenth main scan (j), V3 (nozzle duty: 75%) is the drive voltage of the third main scan (c) and the ninth main scan (i), and V4 (nozzle duty: 100%) is the drive voltage from the fourth main scan (d) to the eighth main scan (h).

In general, when the nozzle duty is reduced, the discharge amount tends to decrease even when the same drive voltage as the drive elements is fed, as shown in FIG. 6(c). However, the affect of structural crosstalk that the discharge nozzles receive from nearby non-discharge nozzles is constant because the non-discharge nozzles never carry out a discharge. Accordingly, the curve of the discharge characteristics Q1 to Q4, which is the correspondence between the nozzles and the discharge amount of the droplets discharged from the nozzles, has a substantially similar shape in each main scan. In the discharge steps other than the fourth main scan (d) to the eighth main scan (h), the nozzles (discharge nozzles) at the end parts of the nozzle row that is to perform a discharge do not discharge (the portion of the non-discharge nozzles is indicated by an alternate long and two short dashes line), and the discharge amount of the nearby discharge nozzles may undergo slight variation due to the effect of the structural crosstalk, but the range of the structural crosstalk effect is very narrow and can be ignored.

Since the discharge characteristics Q1 to Q4 have a substantially similar shape, the discharge characteristics can be made to substantially conform by increasing or decreasing the voltage value of the drive waveform fed to the drive elements. Conventionally, the discharge characteristics differ for each main scan when the discharge pattern differs for each scan, and as a result, the discharge amount in each main scan cannot be made sufficiently uniform even when the drive voltage is adjusted, but in the present embodiment, the discharge characteristics from the nozzles are made approximate and the uniformity of the discharge amount is improved by adjusting the drive voltage when the discharge patterns are constantly the same in all of the main scans as in the present embodiment.

On the other hand, in the second panel region PA2, the movement distance δ of the sub-scan is not necessarily an integral multiple of the arrangement interval of the second partition region PX2. Accordingly, the spatial arrangement between the nozzles N and the second partition region PX2 generally changes for each main scan and the discharge pattern also changes in accordance with therewith. For this reason, in the droplet discharge device of the present embodiment, when droplets are to be discharged onto the second panel region PA2, those among the plurality of nozzles N lying over the second partition region PX2 are selected for each main scan, the droplets are discharged from the selected nozzles, and the drive waveforms of the plurality of drive elements are controlled based on the distribution of the average droplet discharge amount in each combination measured in advance for all combinations of selectable nozzles, so that the discharge amount of the droplets discharged from the plurality of nozzles approximates the predetermined optimal amount.

In accordance with this method, although the discharge pattern, which is a combination of discharge nozzles and non-discharge nozzles, is different for each main scan, the discharge characteristics of nozzles measured in advance may be a single discharge characteristic. Therefore, drive control is made simpler than in the case where the discharge characteristics are measured for each and every discharge pattern and the drive waveforms of the drive elements are calculated for each discharge pattern based on the discharge characteristics.

Examples of the method for measuring the distribution of the average droplet discharge amount in each combination include a method for measuring the distribution of the discharge amounts for all selectable nozzle combinations and calculating the arithmetic mean of the distributions. Also possible is a method in which droplets from the plurality of nozzles of each combination are discharged in an overlapping manner on the same recording medium, the total amount is calculated for each nozzle, the value obtained by dividing the total amount by the number of deposited droplets is used as the arithmetic mean, and the arithmetic mean is calculated for each nozzle.

Figure 7:
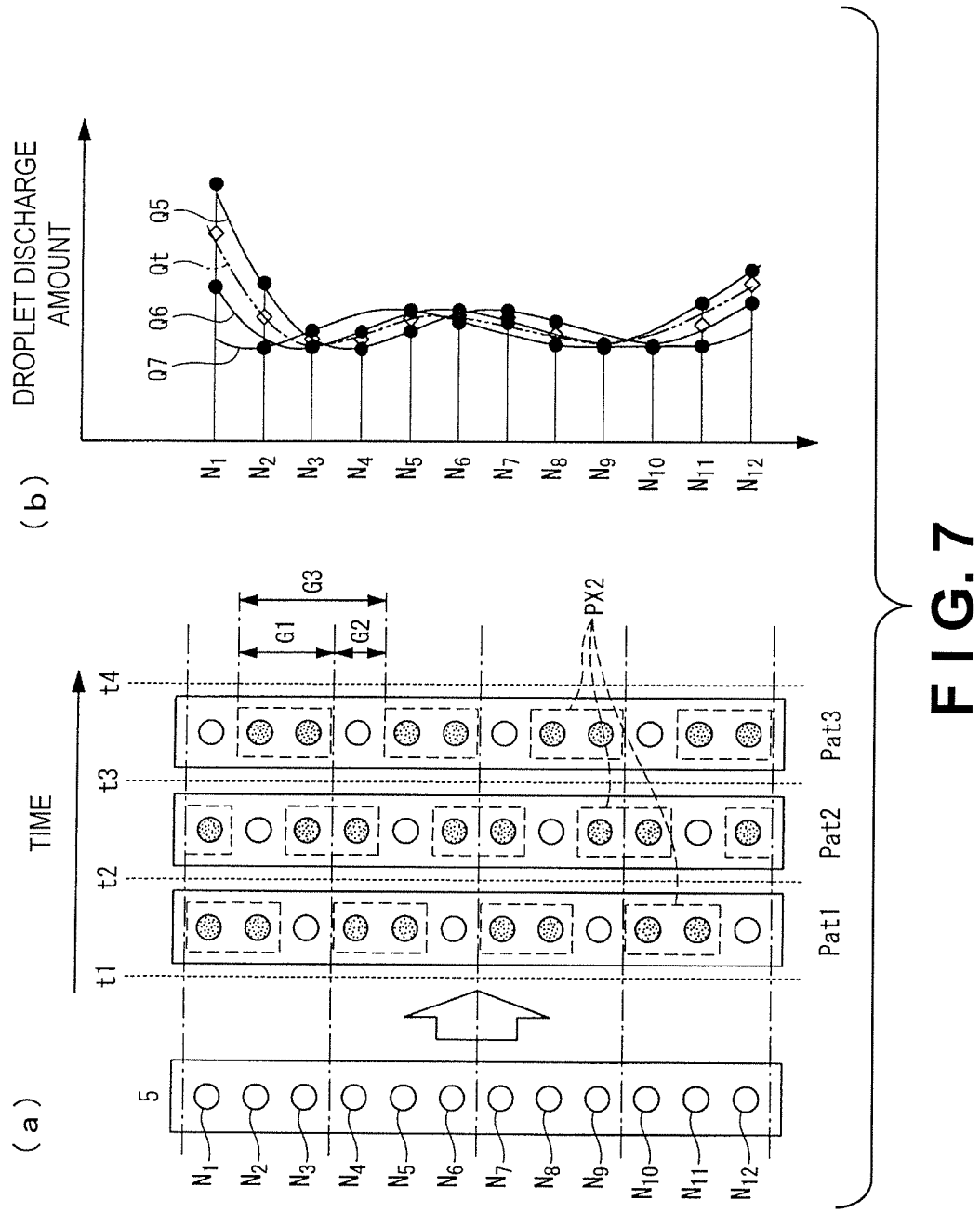
FIG. 7 is a descriptive view of the method for measuring the distribution of the average discharge amount of a plurality of discharge patterns.

FIG. 7 is a descriptive view of the method for measuring the distribution of the average discharge amount using the later method. FIG. 7(a) is a graph showing the discharge nozzles and the discharge timing of the discharge nozzles; and FIG. 7(b) is a diagram showing the droplet discharge amount from the nozzles The example described in FIG. 7 is the case in which the length G1 in the sub-scanning direction of the second partition region PX2 and the length G2 in the sub-scanning direction of the region between the second partition regions PX2 are in a 2:1 relationship. In FIG. 7, the number of nozzles included in the droplet discharge head 5 is 12 (nozzles $N_1$ to $N_{12}$) in order to facilitate description. The reference numeral G3 shows the arrangement interval in the sub-scanning direction of the second partition region PX2. The chain line in FIG. 7(a) shows the virtual spatial arrangement between the nozzles $N_1$ to $N_{12}$ and the second partition region PX2.

When droplets are discharged into the second partition region PX2 having the configuration described above, the ratio between the number of nozzles lying over the second partition region PX2 and the number of nozzles lying over the region between the second partition regions PX2 is substantially 2:1, as shown in FIG. 7(a). Accordingly, the nozzle duty (number of discharge nozzles/total number of nozzles excluding the dummy nozzles) is ⅔.

As described above, the movement distance in the sub-scan of the droplet discharge head 5 is not an integral multiple of the arrangement interval GP3 of the second partition region PX2. Accordingly, the spatial arrangement between the nozzles $N_1$ to $N_{12}$ and the second partition region PX2 is arbitrary, as indicated by the alternate long and short dash line in FIG. 7.

In the case of a configuration in which two adjacent nozzles (discharge nozzles; shaded circles in FIG. 7) contribute to the discharge and a single nozzle (non-discharge nozzle; white circles in FIG. 7) adjacent thereto does not contribute to the discharge, there are only three discharge patterns that can be assumed by the nozzles $N_1$ to $N_{12}$, the discharge patterns being indicated by Pat1 to Pat3 in FIG. 7(a).

The discharge patterns Pat1 to Pat3 have a discharge pattern in which two discharge nozzles and a single discharge nozzle constitute a single unit, and a plurality of the unit patterns of the single unit is arrayed in the sub-scanning direction using the same array sequence. The three discharge patterns Pat1 to Pat3 are formed by using a configuration in which the arrangement positions of discharge nozzles and the non-discharge nozzles are offset by a single position in the sub-scanning direction. The number of discharge patterns (the total number of combinations of the nozzles that can be selected in each main scan) is equal to the number of nozzles included in a single unit pattern; i.e., three.

In the case that droplets are to be discharged onto the second partition region PX2, the discharge pattern among discharge patterns Pat1 to Pat3 that carries out the discharge is different for each main scan. Accordingly, the distribution (discharge characteristics Qt) of the respective average discharge amounts for the discharge patterns Pat1 to Pat3 must be measured and the drive waveform of the drive element corresponding to each nozzle must be controlled based on the distribution so that the discharge amount of the droplets discharged from the plurality of nozzles $N_1$ to $N_{12}$ approximates a predetermined optimal amount.

Specifically, first, droplets are discharged from the nozzles $N_1, N_2, N_4, N_5, N_7, N_8, N_{10}, N_{11}$ in the interval t1 to t2 onto a recording medium (not shown in FIG. 7(a); see the recording medium 16 shown in FIG. 1). In the subsequent interval t2 to t3, droplets are discharged from the nozzles $N_1, N_3, N_4, N_6, N_7, N_9, N_{10}, N_{12}$ onto the same recording medium as the discharge performed in the interval t1 to t2. In the interval t3 to t4, droplets are discharged from the nozzles $N_2, N_3, N_5, N_6, N_7, N_8, N_{11}, N_{12}$ onto the same recording medium as the discharge performed in the interval t1 to t3.

In intervals t1 to t4, the plurality of droplets discharged from the same nozzle is deposited in the same location on the recording medium. For example, the plurality of droplets discharged from the nozzle $N_1$ is deposited in a first deposit position on the recording medium in the intervals t1 to t2 and t2 to t3, and the droplets overlap each other in the first deposit position. The plurality of droplets discharged from the nozzle $N_2$ is deposited in a second deposit position on the recording medium in the intervals t1 to t2 and t3 to t4, and the droplets overlap each other in the second deposit position. The same applies to the droplets discharged from the other nozzles $N_3$ to $N_{12}$.

When the plurality of droplets discharged in the discharge patterns Pat1 to Pat3 are deposited in the same deposition position in this manner, the number of droplet deposits that are deposited in each deposit position is the same for all positions. For example, in the example of FIG. 7(a), the number of droplet deposits that have been deposited in each deposit position is two. Therefore, the average discharge amount (arithmetic mean) of each nozzle is calculated by dividing the total amount of droplets deposited in each deposit position by the number of deposits.

The reference numerals Q1 to Q3 in FIG. 7(b) indicate the distribution (discharge characteristics) of the droplet discharge amount in the patterns Pat1 to Pat3. The reference numeral Qt is a distribution (distribution of the arithmetic mean) obtained by dividing the total amount of droplets deposited in each deposit position by the number of droplet deposits (two).

The distribution Qt of the discharge amounts is strictly speaking different from the distributions Q1 to Q3 of the discharge amounts obtained using the discharge patterns Pat1 to Pat3. However, the distribution Qt of the discharge amounts obtained in this case partially includes the characteristics of the distributions Q1 to Q3 of the discharge amounts obtained using the discharge patterns Pat1 to Pat3 and therefore substantially accurately represents the characteristics of the distributions Q1 to Q3 of the discharge amounts obtained using the discharge patterns Pat1 to Pat3.

In other words, when the distribution of the discharge amounts is calculated in the manner described above, all combinations (discharge patterns Pat1 to Pat3) of a plurality of nozzles used for measuring the distribution Qt of the discharge amounts are combinations of nozzles used for actual discharging. Accordingly, it is therefore possible to obtain a distribution that approximates the distributions Q1 to Q3 of the discharge amounts of the discharge patterns Pat1 to Pat3 used for actual discharging. Therefore, when the discharge amounts of the nozzles $N_1$ to $N_{12}$ are adjusted based on such a distribution Qt of the discharge amounts, the uniformity of the discharge amounts will not be compromised to a greater extent than when the discharge amounts are adjusted based on the distributions Q1 to Q3 of the discharge amounts of the discharge patterns Pat1 to Pat3 using for actual discharging.

Illustrated in FIG. 7 is the case in which the ratio between the length G1 in the sub-scanning direction of the second partition region PX2 and the length G2 between the second partition regions PX2 is 2:1, but this ratio may be arbitrarily set depending the aperture ratio, the precision, and other factors of the second partition region PX2. The discharge patterns Pat1 to Pat3 have a discharge pattern in which two discharge nozzles and a single discharge nozzle constitute a single unit, and a plurality of the unit patterns of the single unit is arrayed in the sub-scanning direction using the same array sequence. However, the configuration of the discharge patterns and the number of discharge patterns may be arbitrarily modified in accordance with the ratio between the length G1 in the sub-scanning direction of the second partition region PX2 and the length G2 between the second partition regions PX2; i.e., the aperture ratio, the precision, and the like of the second partition region PX2.

For example, it is also possible to consider a situation in which the ratio between the length G1 in the sub-scanning direction of the second partition region PX2 and the length G2 between the second partition regions PX2 is 3:1, the number of nozzles lying over the second partition region PX2 is 3, and the number of nozzles lying over the area between the second partition regions PX2 is 1. In this case, all combinations of nozzles; i.e., discharge patterns that can be selected in each main scan, have a discharge pattern in which three discharge nozzles and a single discharge nozzle constitute a single unit, and a plurality of the unit patterns of the single unit is arranged in the sub-scanning direction using the same array sequence. The number of discharge patterns (the total number of combinations of the nozzles that can be selected in each main scan) that exist is the number of variations that can be obtained by offsetting the arrangement positions of the discharge nozzles and the non-discharge nozzles by a single position in the sub-scanning direction. Therefore, the number is equal to the number of nozzles included in a single unit pattern; i.e., four.

FIG. 5 shows that a single droplet discharge head 5 performs discharges in the panel regions PA1, PA2 of two different models. When discharges are made in this manner in the panel regions PA1, PA2 of two different models, the nozzle duty of the droplet discharge head is considerably different in each panel region, and as a result, there are cases in which the effect of electrical crosstalk is dramatic.

For example, it is possible to consider a case in which the nozzle duty is greater when discharges are made in the first panel region PA1 in comparison with the case in which discharges are made in the second panel region PA2. Such a situation occurs when the ratio between the size of the partition region and the size between the partition regions (corresponding to G1 and G2 in FIG. 7) is high in the first panel region PA1 and is low in the second panel region PA2. In this case, the average discharge amount from the nozzles is greater when the discharges are made in the first panel region PA1 than when the discharges are made in the second panel region PA2, as shown in FIG. 6. Accordingly, when the discharges are made in the second panel region PA2, the drive voltage of the drive elements must be made higher than when the discharges are made in the first panel region PA1, and the average discharge amount must be made equal in the two panel regions PA1, PA2.

In this case, it is possible to consider a method in which the drive conditions for making discharges in the second panel region PA2 are corrected using as a reference the drive conditions for making discharges in the first panel region PA1, and a method in which the drive conditions for making discharges in the first panel region PA1 are corrected using as a reference the drive conditions for making discharges in the second panel region PA2. The former method is preferred for the following reasons.

In the first panel region PA1 in which the nozzle duty is greater, a large discharge amount is obtained with a low drive voltage, as shown in FIG. 6. Therefore, the voltage fed to the droplet discharge head 5 from a power source (not shown) may be a relatively low voltage. On the other hand, in the second panel region PA2 in which the nozzle duty is less, the same discharge amount can be obtained by feeding a high drive voltage. Therefore, the voltage that must be fed to the droplet discharge head 5 from the power source (not shown) is high.

Generally speaking, the device has a limit in terms of the magnitude of the voltage fed to the droplet discharge head 5, and is forcibly shut down when the voltage thus fed is greater than or equal to a predetermined voltage. Accordingly, the voltage fed to the droplet discharge head 5 is preferably low, and from this viewpoint, the drive conditions of the first panel region PA1 in which the nozzle duty is greater are preferably used as a reference.

Figure 8:
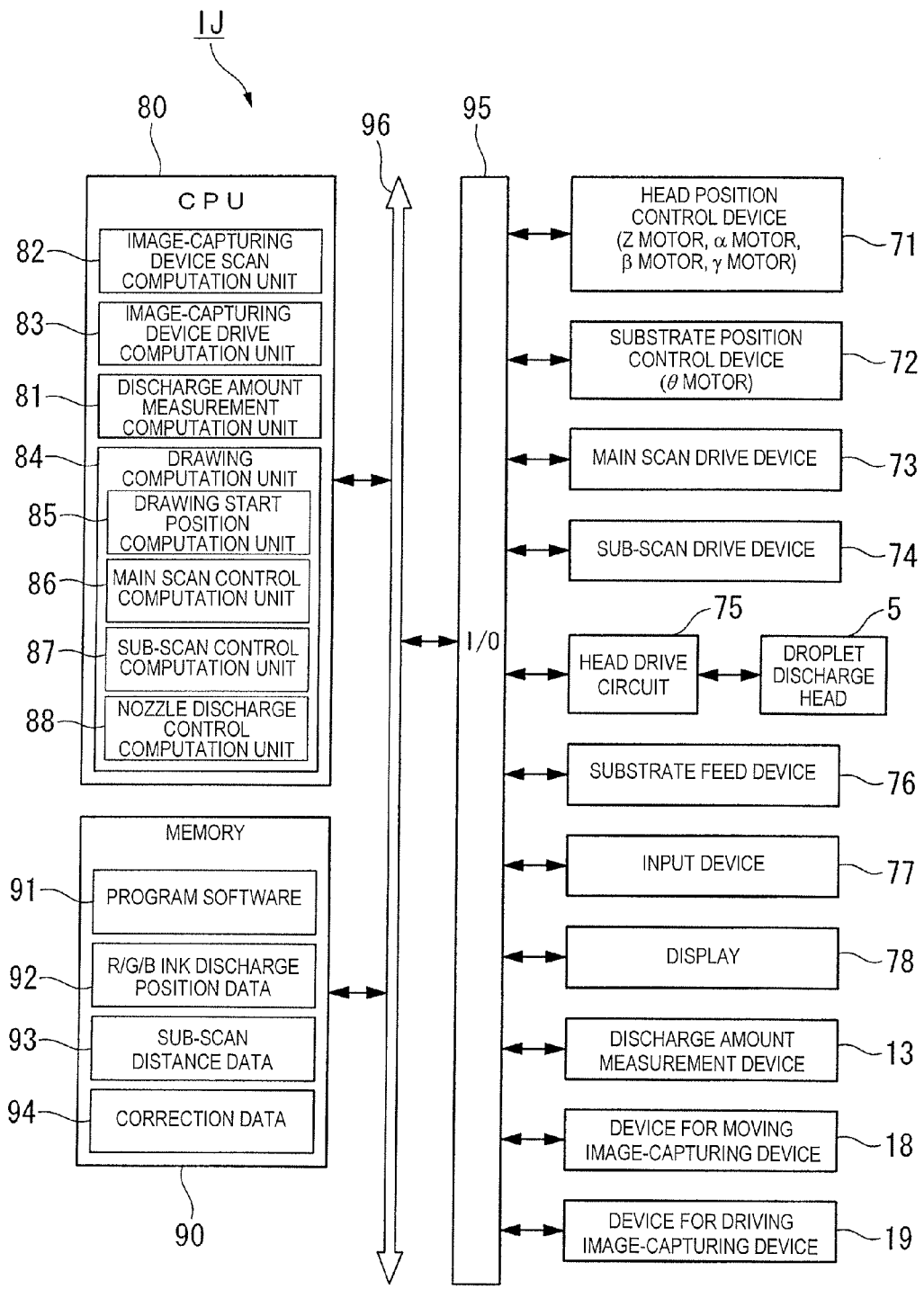
FIG. 8 is a block view showing the electrical configuration of the droplet discharge device.

FIG. 8 is a block view showing the electrical configuration of a droplet discharge device IJ. The droplet discharge device IJ has a CPU (computation processing device) 80 for carrying out various computations as a processor, and a memory (storage device) 90 for storing various information.

Connected to the CPU 80 via an I/O interface 95 and a data bus 96 are a head position control device 71 for controlling the position of the droplet discharge head 5, a substrate position control device 72 for controlling the position of the color filter substrate, a main scan drive device 73 for controlling the stage movement device 3 (see FIG. 1) and moving the droplet discharge head 5 in the main scanning direction over the color filter substrate, a sub-scan drive device 74 for controlling the carriage movement device 6 (see FIG. 1) and moving the carriage (droplet discharge head 5) in the sub-scanning direction over the color filter substrate, a head drive circuit 75 for driving the drive elements in the droplet discharge head 5, and a substrate feed device 76 for feeding the color filter substrate to a predetermined work position in the droplet discharge device IJ. The I/O device 77, the display 78, the discharge amount measurement device 13, the image-capturing device movement device 18, and the image-capturing device drive device 19 are also connected to the CPU 80 via the I/O interface 95 and the data bus 96.

The head position control device 71 has an α motor for causing the droplet discharge head 5 to rotate in plane, a β motor for causing the droplet discharge head 5 to pivotably rotate about the axis parallel to the sub-scanning direction, a y motor for pivotably rotating the droplet discharge head 5 about the axis parallel to the main scanning direction, and a Z motor for moving the droplet discharge head 5 parallel to the vertical direction.

The substrate position control device 72 has a θ motor for causing the work stage 2 (see FIG. 1) to rotate in plane.

The main scan drive device 73 has a stage movement device 3 (see FIG. 1) that has a guide rail extending in the main scanning direction and a slider that houses a pulse-driven linear motor. The slider moves parallel to the main scanning direction along the guide rail when the housed linear motor is actuated.

The sub-scan drive device 74 has a carriage movement device 6 (see FIG. 1) that has a guide rail extending in the sub-scanning direction and a slider that houses a pulse-driven linear motor. The slider moves parallel to the sub-scanning direction along the guide rail when the housed linear motor is actuated.

The image-capturing device movement device 18 has a guide rail extending in the sub-scanning direction and a slider that houses a pulse-driven linear motor. The slider moves parallel to the sub-scanning direction along the guide rail when the housed linear motor is actuated.

The slider and the pulse-driven linear motor in the slider can be precisely controlled for rotational angle of the output shaft by using pulse signals fed to the motor. Therefore, it is possible to control with high precision the position in the main scanning direction, the position in the sub-scanning direction, and the like of the carriage 4 (see FIG. 1) on which the droplet discharge head 5 is mounted, the sheet member 16 (see FIG. 1) disposed on the measurement stage 14, and the image-capturing device 17 (see FIG. 1) moved by the image-capturing device movement device 18.

The positional control of the droplet discharge head 5, image-capturing device 17 (see FIG. 1), and the work stage 2 (see FIG. 1) is not limited to positional control using a pulse motor, and it is also possible to use feedback control using a servomotor, or any other control method.

The memory 90 is a concept that includes random access memory (RAM), read-only memory (ROM), and other semiconductor memory, hard disk, CD-ROM read device, disk storage medium, and other external storage devices. In terms of function, the memory 90 has a storage region 91 for storing program software in which the control procedures for the droplet discharge device IJ are recorded; a storage region 92 for storing as coordinate data the discharge positions within the color filter substrate (see FIG. 1) for implementing a stripe arrangement, a delta arrangement, a mosaic arrangement, and various other R, G, B arrangements; a storage region 93 for storing the sub-scan movement distance of the color filter substrate in the sub-scanning direction; a storage region 94 for storing correction data when the discharge amount is calculated from a droplet image captured by an image-capturing device; a region that functions as a CPU 80 work area, temporary file storage, and the like; and various other storage regions.

The CPU 80 controls discharges of ink; i.e., color filter material, in predetermined positions on the surface of a color filter substrate in accordance with the program software stored in the memory 90. Specifically implemented functions include a discharge amount measurement computation unit 81 for carrying out computations for measuring discharge amounts using the discharge amount measurement device 13, image-capturing device scan computation unit 82 for carrying out computations for scanning the image-capturing device in the sub-scanning direction using the image-capturing device movement device 18, an image-capturing device drive computation unit 83 for carrying out computations for imaging droplets (dry film) deposited on the recording surface 16a (see FIG. 1) of the sheet member 16 using the image-capturing device drive device 19, and a drawing computation unit 84 for carrying out computations for drawing color filter material using the droplet discharge head 5.

The drawing computation unit 84 can be further divided into a drawing start position computation unit 85 for setting the droplet discharge head 5 in the initial position for drawing, a main scan control computation unit 86 for computing control for scanning and moving the droplet discharge head 5 at a predetermined speed in the main scanning direction, a sub-scan control computation unit 87 for computing control for shifting the color filter substrate by a predetermined sub-scan distance in the sub-scanning direction, a nozzle discharge control computation unit 88 for carrying out computations for actuating any among a plurality of nozzles in the droplet discharge head 5 and controlling whether or not to discharge ink; i.e., the color filter material, and various other function computation units.

The CPU 80 and the memory 90 are included in the control device 11 shown in FIG. 1. In the present embodiment, the above-described functions are implemented by software using the CPU 80, but it is also possible to use an electronic circuit when the above-described functions can be implemented using an electronic circuit along without the use of a CPU.

Figure 9:
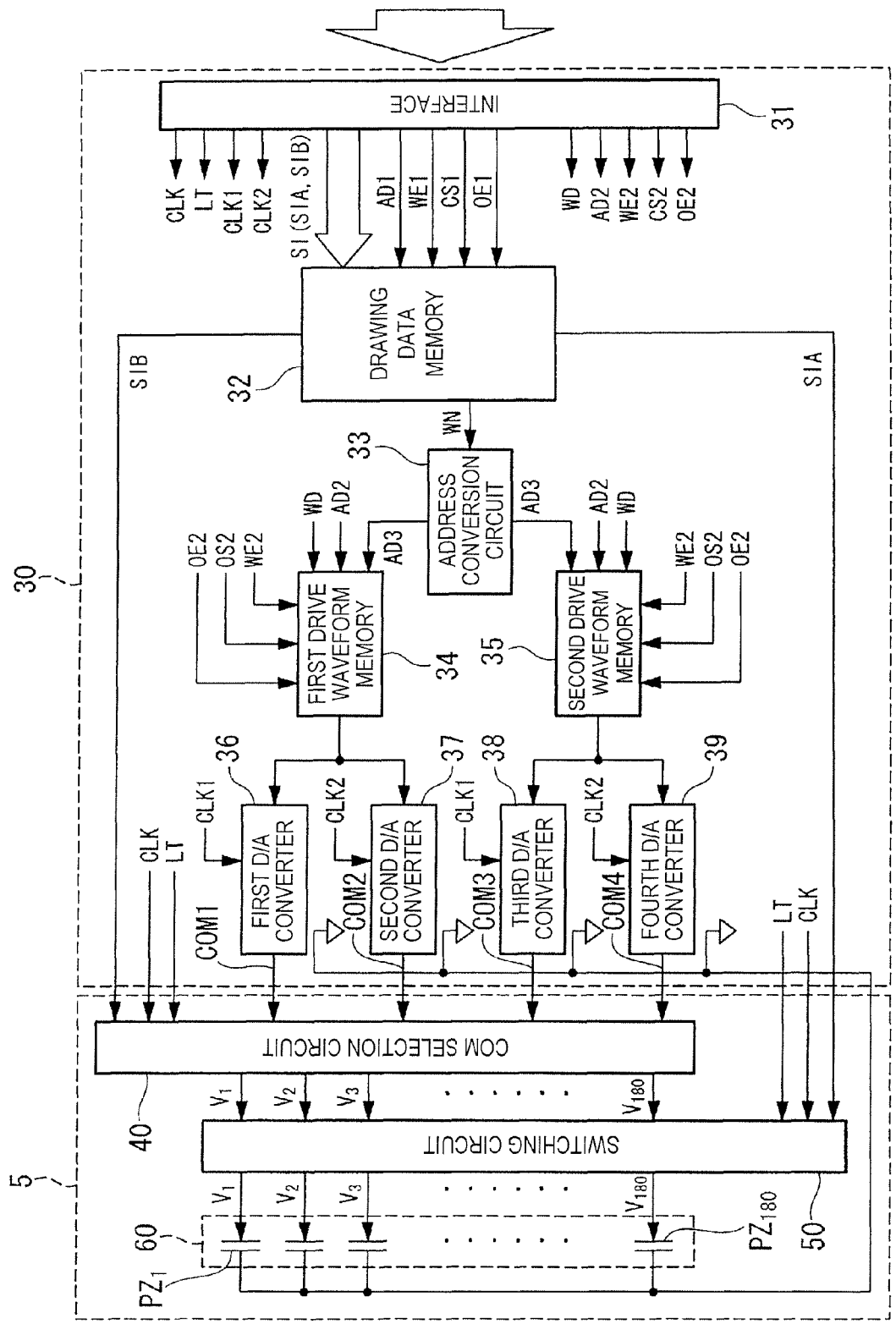
FIG. 9 is a circuit configuration diagram of the droplet discharge head and the drive circuit substrate of the droplet discharge head.

FIG. 9 is a block diagram of the circuit of the droplet discharge head 5 and the drive circuit substrate 30 for feeding drive signals to the droplet discharge head 5. The drive circuit substrate 30 includes the head drive circuit 75 shown in FIG. 8 and a part of the memory 90, and constitutes a portion of control unit of the present invention together with the control device 11 shown in FIG. 1.

The drive circuit substrate 30 is provided with an interface 31, a drawing data memory 32, an address conversion circuit 33, a first drive waveform memory 34, a second drive waveform memory 35, a first D/A converter 36, a second D/A converter 37, a third D/A converter 38, and a fourth D/A converter 39. The droplet discharge head 5 is provided with a COM selection circuit 40, a switching circuit 50, and a piezoelectric element group 60 having piezoelectric elements $PZ_1$ to $PZ_{180}$. The piezoelectric elements $PZ_1$ to $PZ_{180}$ may be notated as capacitors, as shown in FIG. 3.

The drawing data memory 32 corresponds to first storage section in this embodiment; the first drive waveform memory 34 and the second drive waveform memory 35 correspond to second storage section in this embodiment; the first D/A converter 36, the second D/A converter 37, the third D/A converter 38, and the fourth D/A converter 39 correspond to drive signal generation section in this embodiment; the COM selection circuit 40 corresponds to drive signal selection section in this embodiment; and the switching circuit 50 corresponds to feed switching section in this embodiment.

The control device 11 (see FIG. 1) and the interface 31 of the drive circuit substrate 30 are connected by a PCI bus (not shown), and outputted to the interface 31 by the control device 11 via the PCI bus are drawing data SI, and the following drive control signals: a clock signal CLK, a latch signal LT, DAC clock signals CLK1 and CLK2, a drawing data address signal AD1, a drawing data write enable signal WE1, a drive waveform data signal WD, a waveform data address signal AD2, a waveform data write enable signal WE2, chip selector signals CS1 and CS2, and output enable signals OE1 and OE2.

The interface 31 presents to the drawing data memory 32 the following: the drawing data SI, the drawing data write enable signal WE1, the drawing data address signal AD1, the chip selector signal CS1, and the output enable signal OE1. The interface 31 presents the clock signal CLK and the latch signal LT to the COM selection circuit 40 and the switching circuit 50 of the droplet discharge head 5. The interface 31 presents the DAC clock signal CLK1 to the first D/A converter 36 and the third D/A converter 38, and presents the DAC clock signal CLK2 to the second D/A converter 37 and the fourth D/A converter 39. The interface 31 presents the waveform data write enable signal WE2, the waveform data address signal AD2, the drive waveform data signal WD, the chip selector signal CS2, and the output enable signal OE2 to the first drive waveform memory 34 and the second drive waveform memory 35.

The drawing data memory 32 is, e.g., a 32-bit SRAM, and stores drawing data SI in an address specified by the drawing data address signal AD1 when data write is requested by the drawing data write enable signal WE1, the chip selector signal CS1, and the output enable signal OE1. In this case, the drawing data SI is composed of discharge data SIA and COM selection data SIB (drive signal selection data). The discharge data SIA is bitmap data for dividing the pixel pattern formed on the color filter substrate P into the form of a matrix and mapping binary data that specifies whether or not to discharge droplets for each dot constituting the matrix. The dot pitch in the Y-axis direction of the matrix corresponds to the nozzle pitch of the droplet discharge head 5, that is to say, the discharge data SIA is data for specifying whether or not to feed a drive signal to the piezoelectric elements $PZ_1$ to $PZ_{180}$ that correspond to the nozzles $N_1$ to $N_{180}$ in the case that the droplet discharge head 5 is moved to a predetermined position.

In the present embodiment, 2-bit data is used for specifying whether or not to feed a drive signal to the piezoelectric elements $PZ_1$ to $PZ_{180}$. The higher-order bit is referred to as SIH and the lower-order bit is referred to as SIL in the 2-bit data. When (SIH, SIL)=(0, 0), a non-feed (non-discharge) drive signal is specified, and when (SIH, SIL)=(0, 1), (1, 0), (1, 1), a feed (discharge) drive signal is specified. In other words, SIH data ($SIH_1$ to $SIH_{180}$) that corresponds to the piezoelectric elements $PZ_1$ to $PZ_{180}$, respectively, and SIL data ($SIL_1$ to $SIL_{180}$) are included in the discharge data SIA. Such discharge data SIA differs in accordance with the pixel pattern of the color filter substrate P, and is therefore sent from the control device 11 in correspondence to the number of pixel patterns, and stored in the drawing data memory 32. In the present embodiment, 2-bit data is used for specifying whether or not to feed drive signals to the piezoelectric elements $PZ_1$ to $PZ_{180}$, but no limitation is imposed thereby, and it shall be apparent that 1-bit data may also be used.

On the other hand, the COM selection data SIB is data for specifying the types of drive signals fed to the piezoelectric elements $PZ_1$ to $PZ_{180}$. In the present embodiment, a single drive signal from among four types of drive signals is selected and fed for each piezoelectric element $PZ_1$ to $PZ_{180}$. In the present embodiment, the four types of drive signals are referred to as COM1, COM2, COM3, and COM4. In other words, the COM selection data SIB is data for specifying COM1, COM2, COM3, or COM4 as the drive signal to be applied to the piezoelectric elements $PZ_1$ to $PZ_{180}$. Also included in the COM selection data SIB is drive waveform number data WN for specifying the waveform (drive waveform) of the drive signals COM1, COM2, COM3, COM4.

In the present embodiment, 2-bit data is required for specifying the drive signal in order to select from among four types of drive signals. In the present embodiment, among the 2-bit data for specifying the drive signal, the higher order bit is referred to as WSH and the lower order bit is referred to as WSL. COM1 is specified when (WSH, WSL)=(0, 0), COM2 is specified when (WSH, WSL)=(0, 1), COM3 is specified when (WSH, WSL)=(1, 0), and COM4 is specified when (WSH, WSL)=(1, 1). In other words, WSH data ($WSH_1$ to $WSH_{180}$) and ($WSL_1$ to $WSL_{180}$) that correspond to the piezoelectric elements $PZ_1$ to $PZ_{180}$, respectively, are included in the COM selection data SIB. In the present embodiment, one combination of drive waveforms of the drive signals COM1 to COM4 can be selected from among 64 combinations. Specifically, the drive waveform number data WN for specifying the drive waveform is 6-bit data.

Figure 10:
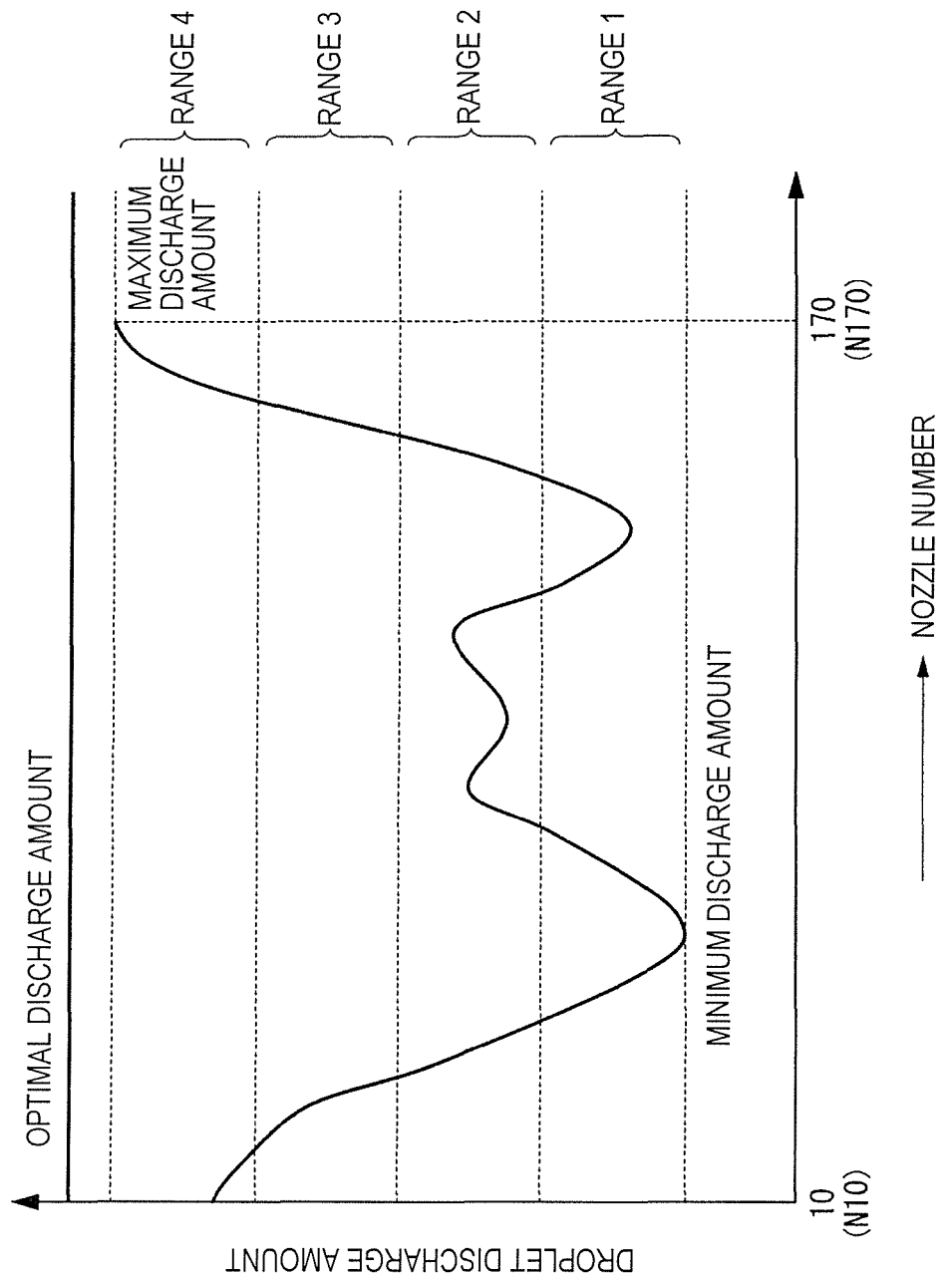
FIG. 10 is a graph showing the discharge characteristics of the nozzles.

The COM selection data SIB is set in accordance with the distribution (discharge characteristics) of the droplet discharge amount of each $N_1$ to $N_{180}$ of the droplet discharge head 5. FIG. 10 shows an example of the distribution of the droplet discharge amount. In FIG. 10, the horizontal axis is the nozzle number and the vertical axis is the droplet discharge amount. Since the nonuniformity of the droplet discharge amount is very high for nozzles at the two ends (nozzles $N_1$ to $N_9$, and nozzles $N_{171}$ to $N_{180}$) in terms of the characteristics of the droplet discharge head 5, the discharge distribution of these nozzles is omitted. In actuality, the 160 nozzles $_{10}$ to $N_{170}$ among the 180 nozzles are used when the droplet discharge head 5 is actually used.

The drive signal for feeding the piezoelectric elements $PZ_{10}$ to $PZ_{170}$ can be modified so that the droplet discharge amount of the nozzles $N_{10}$ to $N_{170}$ approximates an optimal discharge amount in order to correct the nonuniformity of the droplet discharge amount shown in FIG. 10. For example, the voltage value of the drive signals fed to the piezoelectric elements that correspond to these nozzles can be increased in order to correct the droplet discharge amounts of nozzles that are considerably different from the optimal droplet discharge amount in the droplet discharge distribution, as shown in FIG. 10.

In reality, the distribution of the droplet discharge amount as shown in FIG. 10 is measured in advance (e.g., during shipping inspection of the present droplet discharge device IJ), and the drive signals of the piezoelectric elements $PZ_{10}$ to $PZ_{170}$ are calculated so that the droplet discharge amount of the nozzles $N_{10}$ to $N_{170}$ approximates the optimal discharge amount. Fundamentally, the drive signal calculated for each piezoelectric element $PZ_{10}$ to $PZ_{170}$ can be prepared and fed, but in such a case, there are problems in that a maximum of 160 drive signal types must be prepared, the number of components increases, device costs are higher, the drive circuit substrate 30 increases in size, and power consumption is higher. Therefore, such a configuration is difficult to implement in reality. In view of the above, in the present embodiment, four types of drive signals are used and the droplet discharge amounts of the nozzles $N_{10}$ to $N_{170}$ are set so as to approximate an optimal discharge amount. This is due to the fact that the nonuniformity of the droplet discharge amount can be kept to a level (nonuniformity of no more than 1.2%) that cannot be noticed to the unaided eye in terms of striping by using at least four types of drive signals. The four types of drive signals are provided to the COM selection data SIB in this manner, namely, COM1 to COM4. A specific example of the method for setting the COM selection data SIB will be described.

EXAMPLE 1 OF METHOD FOR SETTING COM SELECTION DATA SIB

Figure 11:
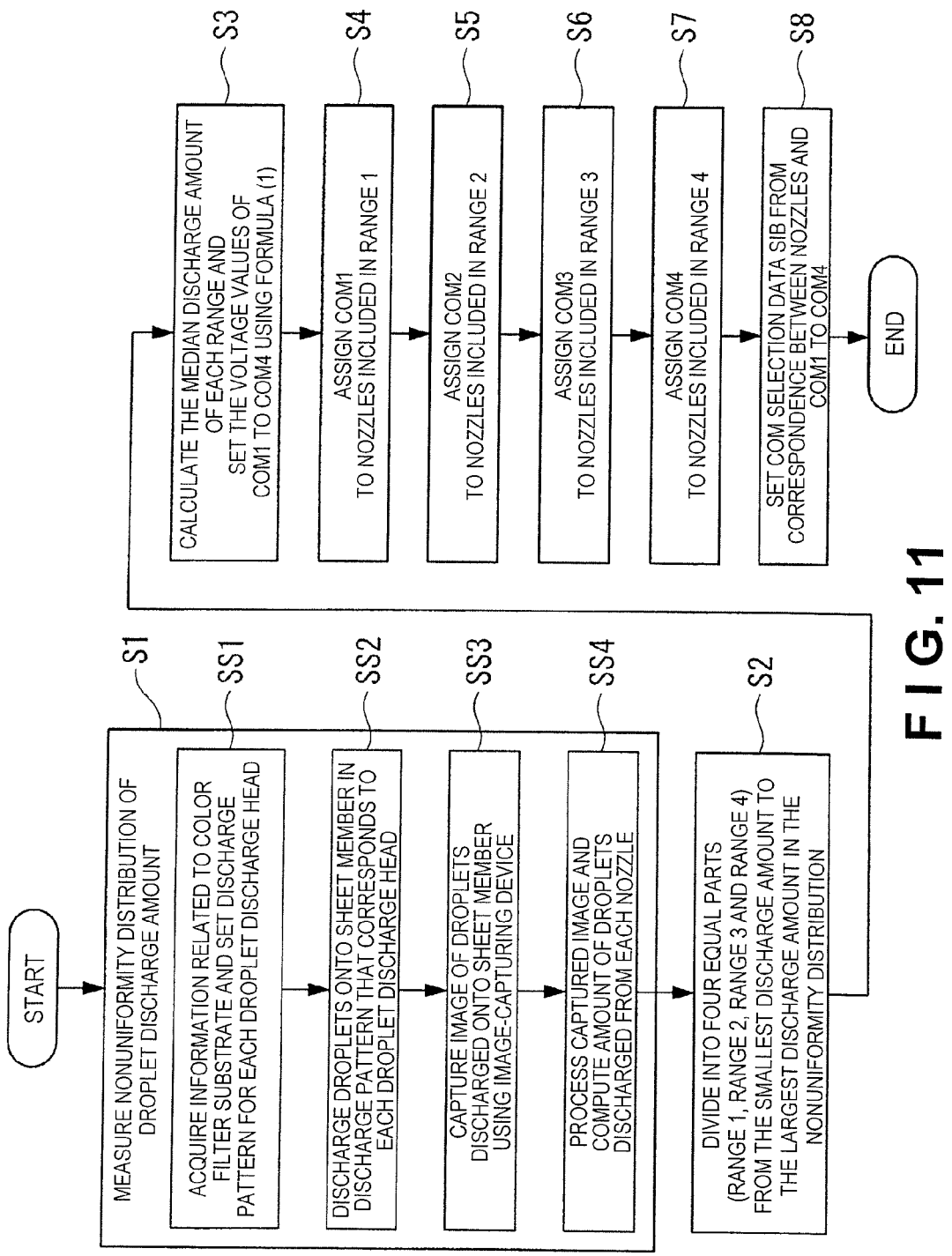
FIG. 11 is a flowchart for describing the method for setting the drive waveform of each nozzle.

First, a specific example 1 of the method for setting the COM selection data SIB is described with reference to the flowchart in FIG. 11. In the present embodiment, reference will be made to FIGS. 1, 5, 7, and 8 as required.

First, a predetermined reference drive voltage V0 is applied to the piezoelectric elements $PZ_{10}$ to $PZ_{170}$ and the distribution of the droplet discharge amounts of the nozzles $N_{10}$ to $N_{170}$ is measured in advance (step S1).

The distribution of the droplet discharge amount is determined using the discharge amount measurement device 13 shown in FIGS. 1 and 8. Prior to measurement, the drawing computation unit 84 shown in FIG. 8 first formulates discharge data SIA based on information (pixel pattern, substrate size, and other information, which is stored in the storage region 92 of the memory 90) related to the color filter substrate P acquired from a higher-order control device. The combination of the discharge nozzles and the non-discharge nozzles; i.e., the discharge pattern, is set for each droplet discharge head 5 based on the discharge data SIA. The drawing computation unit 84 detects the arrangement interval of the partition regions in the sub-scanning direction based on the information related to the pixel pattern among the information related to the color filter substrate P, and stores the arrangement interval in the storage region 93 of the memory 90.

In the droplet discharge device of the present embodiment, the movement distance in the sub-scanning direction is set to an integral multiple of the arrangement interval of the partition regions of a specific type of panel region (first panel region PA1 in the example of FIG. 5) among the panel regions, which are a plurality of models disposed on the large color filter substrate P. The discharge pattern in all the main scans is thereby fixed in relation to a specific panel region.

For this reason, in step SS1, one type of discharge pattern is set for each droplet discharge head as the discharge pattern when a specific panel region is subjected to a main scan. In the case that other panel regions are subjected to a main scan, nozzles lying over the partition regions are selected for each main scan in the conventional manner.

Next, the drawing computation unit 84 controls the stage movement device 3 and the carriage movement device 6 and moves the carriage 4 and the measurement stage 14 of the discharge amount measurement device 13 to mutually opposing positions. Droplets are discharged from the nozzles of the droplet discharge head 5 and deposited (step SS2) on the recording surface 16a in the discharge pattern set for each droplet discharge head in a state in which the recording surface 16a of the sheet member 16 disposed on the measurement stage 14 and the nozzle surface of the droplet discharge head 5 are arranged facing each other.

In this case, one type of discharge pattern is set in relation to a specific panel region among a plurality of panel regions disposed on the large color filter substrate P. Accordingly, droplets are discharged in the single discharge pattern from the nozzles N. On the other hand, since the discharge pattern is not singularly specified for other panel regions, all nozzle combinations (discharge patterns) that can be selected in each main scan lie over a single location on the recording surface 16a and discharging is performed using the method shown in FIG. 7.

When the droplets have been deposited on the recording surface 16a, the image-capturing device scan computation unit 82 controls the image-capturing device movement device 18 and moves the image-capturing device 17 above the recording surface 16a on which droplets have been deposited. The image-capturing device drive computation unit 83 controls the image-capturing device 17, captures an image of the dried film of the droplet deposited on the recording surface 16a, and presents the captured image data from the image-capturing device 17 to the discharge amount measurement computation unit 81 (step SS3).

The discharge amount measurement computation unit 81 measures the surface area as viewed from the Z direction of the dried film of the droplet using an image processing technique. The droplet discharge amount is calculated from the surface area of the dried film using correction data specifying the relationship between the discharge amount and the surface area of the dried film, the correction data being stored in the storage region 94 of the memory 90. The distribution (discharge characteristics) of the discharge amount of the nozzles is detected (step SS4) based on the computational results.

The distribution of the discharge amounts of the nozzles is set for each panel region disposed on the large color filter substrate P. In relation to the panel region of a specific model, there is only one type of discharge pattern for each droplet discharge head. Therefore, the distribution of the discharge amounts for this single type of discharge pattern can be calculated. On the other hand, the discharge pattern is not limited to a single type in relation to the other panel regions. Therefore, the distribution of the average discharge amount for each discharge pattern is calculated. In other words, in step SS2, the sum of the droplet discharge amounts of the discharge patterns discharged in an overlapping manner in the same location on the recording surface 16a is determined, the total amount is divided by the number of droplets deposited in each deposit position to calculate the average discharge amount, and the average discharge amount is determined for each nozzle, whereby the distribution of the discharge amounts of the nozzles; i.e., the distribution of the average discharge amount for each pattern, is calculated.

Thus, when the distribution of the droplet discharge amounts has been measured, the drawing computation unit 84 detects the minimum discharge amount (smallest discharge amount) and the maximum discharge amount (largest discharge amount) among the discharge amounts of the nozzles. The range from the minimum discharge amount to the maximum discharge amount is divided into four equal parts, namely, range 1, range 2, range 3, and range 4 (step S2).

Next, the drawing computation unit 84 computes the COM setting voltage for each range 1 to 4 using the formula (1) noted below; and sets COM1 to be the COM setting voltage calculated for range 1, sets COM2 to be the COM setting voltage calculated for range 2, sets COM3 to be the COM setting voltage calculated for range 3, and sets COM4 to be the COM setting voltage calculated for range 4 (step S3).

In formula (1) below, K is a constant for converting the droplet discharge amount to a voltage value. Also, in the formula (1) below, the "median discharge amount of the range" may be substituted with "the average discharge amount of all nozzles in each range."

$$\text{COM setting voltage} = V0 - K \cdot (\text{median discharge amount of the range} - \text{optimal discharge amount}) \quad (1)$$

The drawing computation unit 84 assigns COM1 to the nozzles included in range 1 (step S4), assigns COM2 to the nozzles included in range 2 (step S5), assigns COM3 to the nozzles included in range 3 (step S6), and assigns COM4 to the nozzles included in range 4 (step S7). The COM selection data SIB is set (step S8) based on the corresponding relationship between the nozzles determined in the manner described above and COM1 to COM4.

FIG. 12 is an example of the drive waveforms of COM1 to COM4 having voltage values calculated in the manner described above. The drawing computation unit 84 sets the digital data (drive waveform data) of the drive waveforms of COM1 to COM4, and sets the drive waveform number data WN showing the combinations of the drive waveform data of COM1 to COM4.

EXAMPLE 2 OF METHOD FOR SETTING COM SELECTION DATA SIB

Figure 13:
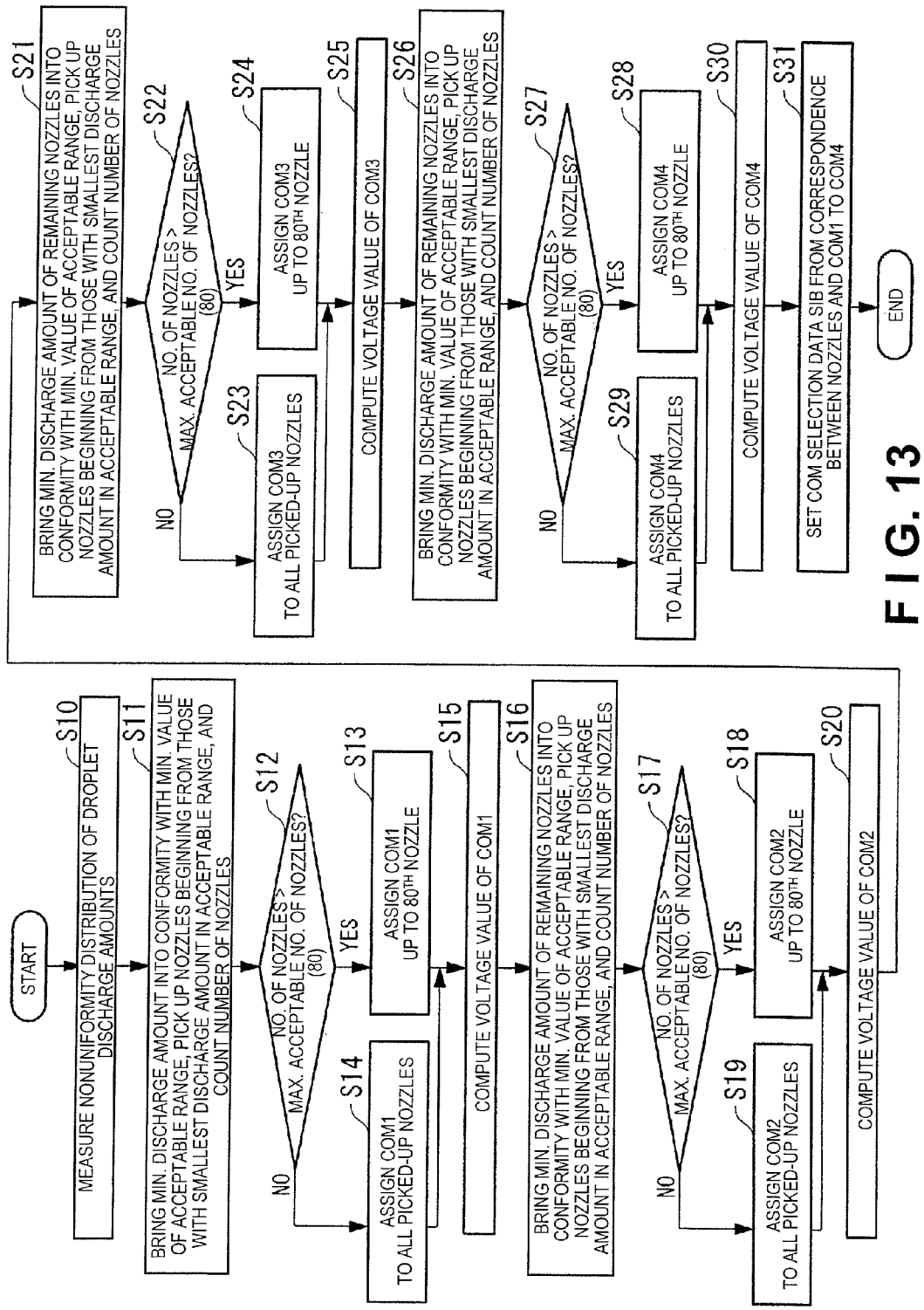
FIG. 13 is a flowchart for describing the method for setting the drive waveform of each nozzle.

Next, a specific example 2 of the method for setting the COM selection data SIB is described with reference to the flowchart in FIG. 13. First, a predetermined reference drive voltage V0 is applied to the piezoelectric elements $PZ_{10}$ to $PZ_{170}$ and the distribution of the droplet discharge amounts of the nozzles $N_{10}$ to $N_{170}$ is measured in advance (step S10) in the same manner as specific example 1. This measurement method is the same as that described in specific example 1 described above.

The drawing computation unit 84 brings the minimum discharge amount of the discharge distribution into conformity with the minimum value of the acceptable nonuniformity range, picks up nozzles in sequence from the lowest droplet discharge amount among the nozzles included in the acceptable nonuniformity range, and counts the number of picked-up nozzles (step S11).

In this case, the acceptable nonuniformity range refers to an acceptable range of the nonuniformity of the discharge amount between nozzles that can be accepted in terms of quality control, and is a value that can be set by a user in advance.

Next, the drawing computation unit 84 determines whether the number of nozzles picked up in step S11 is greater than the maximum acceptable number of nozzles that can be assigned to COM1 (step S12). In this case, the maximum acceptable number of nozzles is set in accordance with the electric current capacity of the first D/A converter 36, and the number is 80 in the present embodiment.

The drawing computation unit 84 assigns COM1 to up to the 80$^{th}$ nozzle (step S13) in the case that the number of nozzles picked up in step S12 is greater than ("YES") the maximum acceptable number of nozzles (i.e., 80). On the other hand, COM1 is assigned to all the picked-up nozzles (step S14) in the case the number of nozzles picked up in step S12 is 80 or less ("NO").

The drawing computation unit 84 computes the median discharge amount between the maximum and minimum discharge amounts of the nozzles to which COM1 has been assigned, and determines (step S15) the voltage value (COM setting voltage) of COM1 based on formula (2) noted below.

In the formula (2) below, K is a constant for converting the droplet discharge amount to a voltage value.

$$\text{COM setting voltage} = V0 - K \cdot (\text{median discharge amount of the range} - \text{optimal discharge amount}) \quad (2)$$

Next, the drawing computation unit 84 brings the minimum discharge amount of the remaining nozzles into conformity with the minimum value of the acceptable nonuniformity range, picks up nozzles in sequence from the lowest droplet discharge amount among the nozzles included in the acceptable nonuniformity range, and counts the number of picked-up nozzles (step S16).

The drawing computation unit 84 subsequently determines whether the number of nozzles picked up in step S16 is greater than the maximum acceptable number of nozzles that can be assigned to COM2 (step S17). In this case, the maximum acceptable number of nozzles is set in accordance with the electric current capacity of the second D/A converter 37, and the number is 80 in the present embodiment.

The drawing computation unit 84 assigns COM2 to up to the $80^{th}$ nozzle (step S18) in the case that the number of nozzles picked up in step S17 is greater than ("YES") the maximum acceptable number of nozzles (i.e., 80). On the other hand, COM2 is assigned to all the piezoelectric elements that correspond to the picked-up nozzles (step S19) in the case the number of nozzles picked up in step S17 is 80 or less ("NO").

The drawing computation unit 84 computes the median discharge amount between the maximum and minimum discharge amounts of the nozzles to which COM2 has been assigned, and determines (step S20) the voltage value (COM setting voltage) of COM2 based on formula (2) noted below.

Next, the drawing computation unit 84 brings the minimum discharge amount of the remaining nozzles into conformity with the minimum value of the acceptable nonuniformity range, picks up nozzles in sequence from the lowest droplet discharge amount among the nozzles included in the acceptable nonuniformity range, and counts the number of picked-up nozzles (step S21).

The drawing computation unit 84 subsequently determines whether the number of nozzles picked up in step S21 is greater than the maximum acceptable number of nozzles that can be assigned to COM3 (step S22). In this case, the maximum acceptable number of nozzles is set in accordance with the electric current capacity of the third D/A converter 38, and the number is 80 in the present embodiment.

The drawing computation unit 84 assigns COM3 to up to the $80^{th}$ nozzle (step S23) in the case that the number of nozzles picked up in step S22 is greater than the maximum acceptable number of nozzles (i.e., 80) ("YES"). On the other hand, COM3 is assigned to all the piezoelectric elements that correspond to the picked-up nozzles (step S24) in the case the number of nozzles picked up in step S22 is 80 or less ("NO").

The drawing computation unit 84 computes the median discharge amount between the maximum and minimum discharge amounts of the nozzles to which COM3 has been assigned, and determines (step S25) the voltage value (COM setting voltage) of COM3 based on formula (2) noted below.

Next, the drawing computation unit 84 brings the minimum discharge amount of the remaining nozzles into conformity with the minimum value of the acceptable nonuniformity range, picks up nozzles in sequence from the lowest droplet discharge amount among the nozzles included in the acceptable nonuniformity range, and counts the number of picked-up nozzles (step S26).

The drawing computation unit 84 subsequently determines whether the number of nozzles picked up in step S26 is greater than the maximum acceptable number of nozzles that can be assigned to COM4 (step S27). In this case, the maximum acceptable number of nozzles is set in accordance with the electric current capacity of the fourth D/A converter 39, and the number is 80 in the present embodiment.

The drawing computation unit 84 assigns COM4 to up to the $80^{th}$ nozzle (step S28) in the case that the number of nozzles picked up in step S27 is greater than the maximum acceptable number of nozzles (i.e., 80) ("YES"). On the other hand, COM4 is assigned to all the piezoelectric elements that correspond to the picked-up nozzles (step S29) in the case the number of nozzles picked up in step S27 is 80 or less ("NO").

The drawing computation unit 84 computes the median discharge amount between the maximum and minimum discharge amounts of the nozzles to which COM4 has been assigned, and determines (step S30) the voltage value (COM setting voltage) of COM4 based on formula (2) noted below.

The drawing computation unit 84 sets the COM selection data SIB based on the corresponding relationship between the nozzles and COM1 to COM4 (step S31).

The drawing computation unit 84 sets the digital data (drive waveform data) of the drive waveform of the COM1 to COM4 having the drive voltages determined in the manner described above in the same as specific example 1, and sets the drive waveform number data WN that shows the combination of the drive waveform data of the COM1 to COM4. In the case that there are remaining nozzles when step S30 has ended, an alarm is activated and the droplet discharge head 5 is determined to be defective or that reassembly must be performed.

Specific example 1 of the method for setting the COM selection data SIB described above allows the nozzles to be assigned to COM1 to COM4 in a more simple manner than specific example 2, but in the case that the maximum acceptable number of nozzles for each COM; i.e., each D/A converter, is established, problems are presented in that the drive capacity of the D/A converter is reduced, the voltage value of the drive signal is reduced, and distortions are generated in the waveforms when the number of nozzles included in the four divided ranges 1 to 4 has exceeded the maximum acceptable number of nozzles. Accordingly, when the number of nozzles included in the ranges 1 has exceeded the maximum acceptable number of nozzles, an alarm is activated, and the droplet discharge head 5 is determined to be defective or require reassembly.

In the method of specific example 2, nozzles can be assigned to COM1 to COM4 without a problem even when the maximum acceptable number of nozzles is set for each D/A converter. In specific example 2, most of the nozzles are assigned to COM1 and COM2 when the droplet discharge amount is substantially devoid of nonuniformity and has approximately uniform characteristics, but the nozzles are always equally assigned to COM1 to COM4 in specific example 1.

As described above, the nonuniformity distribution (discharge characteristics) of the droplet discharge amount varies when the nozzle duty of the droplet discharge head 5 varies. Therefore, the nonuniformity distribution of the droplet discharge amount is measured for each nozzle duty in advance, the drive signals COM1 to COM4 of the piezoelectric elements $PZ_{10}$ to $PZ_{170}$ are calculated so that the droplet discharge amount of the nozzles $N_{10}$ to $N_{170}$ approximates the optimal discharge amount, and the COM selection data SIB that corresponds to the nozzle duty is established. For example, the voltage value obtained by multiplication with a fixed correction variable in accordance with the number of discharge nozzles can be fed to the piezoelectric elements of the discharge nozzles when there is a proportional relationship between the nozzle duty and the droplet discharge amount.

With reference again to FIG. 9, the drawing data memory 32 presents as serial data the discharge data SIA stored in the address specified by the drawing data address signal AD1 to the switching circuit 50 of the droplet discharge head 5 and presents as serial data the COM selection data SIB to the COM selection circuit 40 of the droplet discharge head 5, in the case that the drawing data write enable signal WEL the chip selector signal CS1, and the output enable signal OE1 have made a data read request. The drive waveform number data WN is outputted to the address conversion circuit 33.

The address conversion circuit 33 presents to the first drive waveform memory 34 and the second drive waveform memory 35 an address signal AD3 indicating the storage address of the drive waveform data that corresponds to the drive waveform number specified by the drive waveform number data WN. The first drive waveform memory 34 is a 32 k words×16-bit SRAM, and is memory for storing digital data of the drive waveform (drive waveform data) that corresponds to COM1 and COM2. Similarly, the second drive waveform memory 35 is a 32 k words×16-bit SRAM, and is memory for storing drive waveform data that corresponds to COM3 and COM4.

The first drive waveform memory 34 and the second drive waveform memory 35 stores drive waveform data signal WD in the address specified by the waveform data address signal AD2 in the case that the waveform data write enable signal WE2, the chip selector signal CS2, and the output enable signal OE2 have made a data write request. The drive waveform data signal WD is a 4-byte data signal in which the two higher order bytes are assigned to the drive waveform data that correspond to COM3 and COM4 and the two lower order bytes are assigned to the drive waveform data that correspond to COM1 and COM2; and the two higher order bytes of drive waveform data signal WD are outputted to the first drive waveform memory 34, and the two higher order bytes of drive waveform data signal WD are outputted to the second drive waveform memory 35

The first drive waveform memory 34 presents to the first D/A converter 36 and the second D/A converter 37 drive waveform data stored in the address specified by the address signal AD3 in the case that the waveform data write enable signal WE2, the chip selector signal CS2, and the output enable signal OE2 have made a data read request. The second drive waveform memory 35 presents to the third D/A converter 38 and the fourth D/A converter 39 drive waveform data stored in the address specified by the address signal AD3 in the case that the waveform data write enable signal WE2, the chip selector signal CS2, and the output enable signal OE2 have made a data read request.

The first D/A converter 36 latches the drive waveform data inputted from the first drive waveform memory 34 in synchronization with the rise of the DAC clock signal CLK1, and converts the latched drive waveform data to analog to generate and output the drive signal COM1 to the COM selection circuit 40 of the droplet discharge head 5. The second D/A converter 37 latches the drive waveform data inputted from the first drive waveform memory 34 in synchronization with the rise of the DAC clock signal CLK2, and converts the latched drive waveform data to analog to generate and output the drive signal COM2 to the COM selection circuit 40 of the droplet discharge head 5. The third D/A converter 38 latches the drive waveform data inputted from the second drive waveform memory 35 in synchronization with the rise of the DAC clock signal CLK1, and converts the latched drive waveform data to analog to generate and output the drive signal COM3 to the COM selection circuit 40 of the droplet discharge head 5. The fourth D/A converter 39 latches the drive waveform data inputted from the second drive waveform memory 35 in synchronization with the rise of the DAC clock signal CLK2, and converts the latched drive waveform data to analog to generate and output the drive signal COM4 to the COM selection circuit 40 of the droplet discharge head 5.

As shown in FIG. 14, the COM selection circuit 40 of the droplet discharge head 5 is composed of a shift register circuit 41, a latch circuit 42, and COM selection switching circuits $CSW_1$ to $CSW_{180}$. The shift register circuit 41 receives the clock signal CLK and the COM selection data SIB as input, and converts the COM selection data SIB, which is serial data, to parallel data that is sequentially outputted to the latch circuit 42 in synchronization with the clock signal CLK. Specifically, the shift register circuit 41 sequentially outputs as parallel data the WSH data ($WSH_1$ to $WSH_{180}$) and the WDL data ($WSL_1$ to $WSL_{180}$) that correspond to the piezoelectric elements $PZ_1$ to $PZ_{180}$.

The latch circuit 42 latches the WSH data ($WSH_1$ to $WSH_{180}$) and the WSL data ($WSL_1$ to $WSL_{180}$) in synchronization with the latch signal LT, and outputs the WSH data ($WSH_1$ to $WSH_{180}$) and the WSL data ($WSL_1$ to $WSL_{180}$) in a single process to the COM selection switching circuits $CSW_1$ to $CSW_{180}$. Specifically, the latch circuit 42 outputs $WSH_1$ and $WSL_1$ to the COM selection switching circuit $CSW_1$, outputs $WSH_2$ and $WSL_2$ to the COM selection switching circuit $CSW_2$, and so forth, and outputs $WSH_{180}$ and $WSL_{180}$ to the COM selection switching circuit $CSW_{180}$.

The COM selection switching circuits $CSW_1$ to $CSW_{180}$ receive the drive signals COM1 to COM4 as input, selects any of the drive signals COM1 to COM4 in accordance with the WSH and WSL data inputted from the latch circuit 42, and outputs the selected drive signal to switching elements $SW_1$ to $SW_{180}$ of the later-described switching circuit 50 as $V_1$ to $V_{180}$. Specifically, the COM selection switching circuit $CSW_1$ selects the drive signal COM1 in the case that ($WSH_1$, $WSL_1$)=(0, 0), selects drive signal COM2 when ($WSH_1$, $WSL_1$)=(0, 1), selects drive signal COM3 when ($WSH_1$, $WSL_1$)=(1, 0), and selects drive signal COM4 when ($WSH_1$, $WSL_1$)=(1, 1). The selected drive signal is outputted to the switching element $SW_1$ of the switching circuit 50 as $V_1$. The same applies thereafter through the COM selection switching circuit $CSW_{180}$, which selects the drive signal COM1 in the case that ($WSH_{180}$, $WSL_{180}$)=(0, 0), selects drive signal COM2 when ($WSH_{180}$, $WSL_{180}$)=(0, 1), selects drive signal COM3 when ($WSH_{180}$, $WSL_{180}$)=(1, 0), and selects drive signal COM4 when ($WSH_{180}$, $WSL_{180}$)=(1, 1). The selected drive signal is outputted to the switching element $SW_{180}$ of the switching circuit 50 as $V_{180}$.

Figure 15:
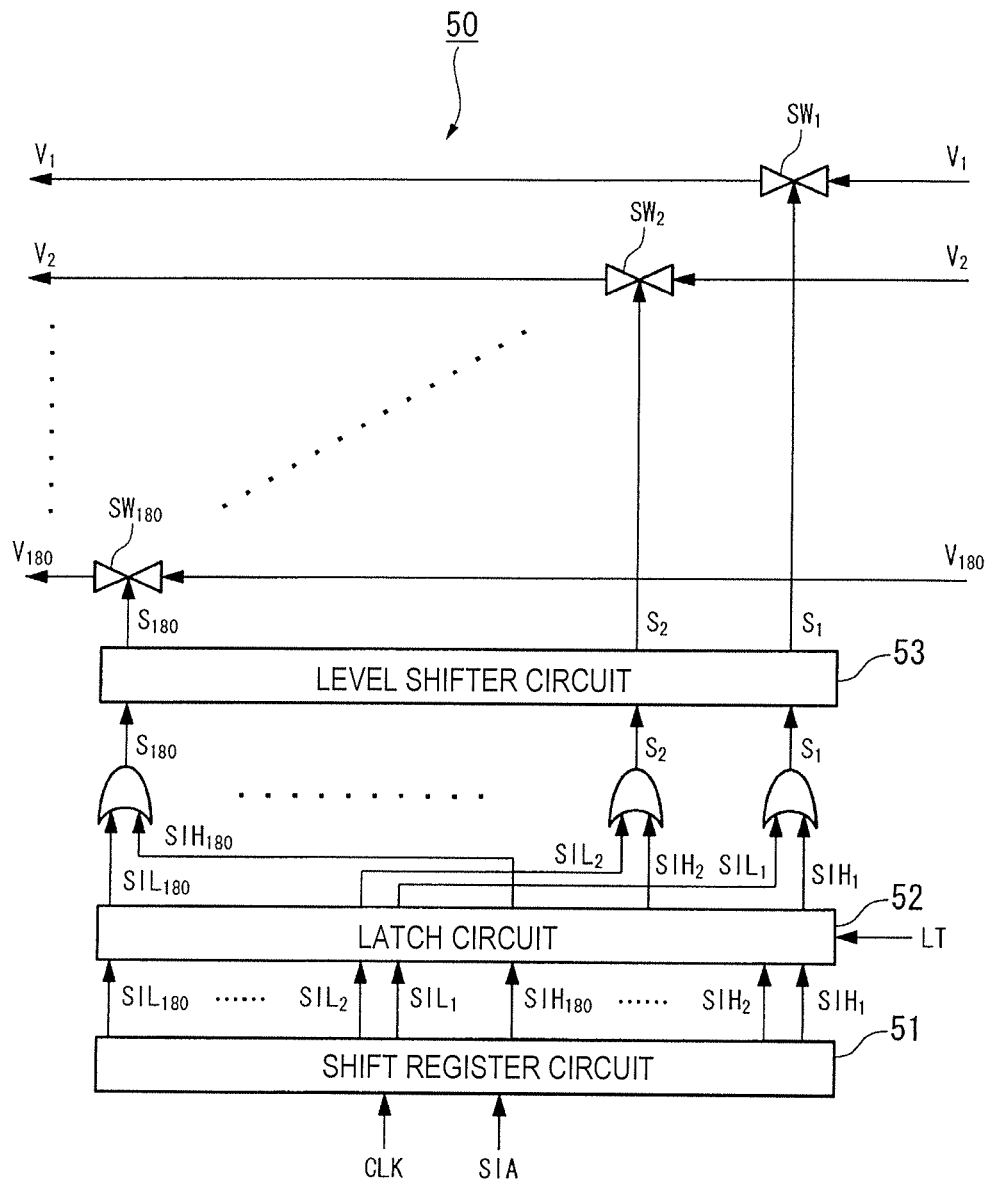
FIG. 15 is a detailed descriptive view of the switching circuit 50.

Next, the switching circuit 50 is composed of a shift register circuit 51, a latch circuit 52, OR-circuits $OR_1$ to $OR_{180}$, a level shifter circuit 53, and switching elements $SW_1$ to $SW_{180}$, as shown in FIG. 15. The shift register circuit 51 receives the clock signal CLK and the discharge data SIA as input, and converts the discharge data SIA, which is serial data, to parallel data that is sequentially outputted to the latch circuit 52 in synchronization with the clock signal CLK. Specifically, the shift register circuit 51 sequentially outputs as parallel data the SIH data (SIR to $SIH_{180}$) and the SIL data ($SIL_1$ to $SIL_{180}$) that correspond to the piezoelectric elements $PZ_1$ to $PZ_{180}$.

The latch circuit 52 latches the SIH data ($SIH_1$ to $SIH_{180}$) and the SIL data ($SIL_1$ to $SIL_{180}$) in synchronization with the latch signal LT, and outputs the SIH data ($SIH_1$ to $SIH_{180}$) and the SIL data ($SIL_1$ to $SIL_{180}$) in a single process to the OR-circuits $OR_1$ to $OR_{180}$. Specifically, the latch circuit 52 outputs $SIH_1$ and $SIL_1$ to the OR-circuit $OR_1$, outputs $SIH_2$ and $SIL_2$ to the OR-circuit $OR_2$, and so forth, and outputs $SIH_{180}$ and $SIL_{180}$ to the OR-circuit $OR_{180}$.

The OR-circuit $OR_1$ outputs a switching signal $S_1$, which is the logical OR of the $SIH_1$ and $SIL_1$, to the level shifter circuit 53. In other words, the feed (discharge) of a drive signal is specified when at least one among SIH and $SIL_1$ is "1," and a switching signal $S_1$ indicating "1" is outputted. The OR-circuit $OR_2$ outputs a switching signal $S_2$, which is the logical OR of the $SIH_2$ and $SIL_2$, to the level shifter circuit 53. The same applies thereafter until OR-circuit $OR_{180}$, which outputs a switching signal $S_{180}$, which is the logical OR of the $SIH_{180}$ and $SIL_{180}$, to the level shifter circuit 53.

The level shifter circuit 53 amplifies the voltage of the switching signals $S_1$ to $S_{180}$ to a level that allows the switching elements $SW_1$ to $SW_{180}$ to be driven. Specifically, the level shifter circuit 53 amplifies the voltage of the switching signal $S_1$ and outputs the switching signal $S_1$ to the switching element $SW_1$, amplifies the voltage of the switching signal $S_2$ and outputs the switching signal $S_2$ to the switching element $SW_2$, and so forth, and amplifies the voltage of the switching signal $S_{180}$ and outputs the switching signal $S_{180}$ to the switching element $SW_{180}$.

The switching element $SW_1$ receives a drive signal $V_1$ and the switching signal $S_1$ as input, is set in an ON state in the case that a switching signal $S_1$ that indicates "1" is inputted, and outputs the drive signal $V_1$ to one of the electrodes of the piezoelectric element $PZ_1$ shown in FIG. 9. The switching element $SW_2$ receives a drive signal $V_2$ and the switching signal $S_2$ as input, is set in an ON state in the case that a switching signal $S_2$ that indicates "1" is inputted, and outputs the drive signal $V_2$ to one of the electrodes of the piezoelectric element $PZ_2$ shown in FIG. 9. The same applies thereafter through the switching element $SW_{180}$, which receives a drive signal $V_{180}$ and the switching signal $S_{180}$ as input, is set in an ON state in the case that a switching signal $S_{180}$ that indicates "1" is inputted, and outputs the drive signal $V_{180}$ to one of the electrodes of the piezoelectric element $PZ_{180}$ shown in FIG. 9.

With reference again to FIG. 9, the other electrodes of the piezoelectric elements $PZ_1$ to $PZ_{180}$ are connected to each other in the droplet discharge head 5 and are grounded in a shared configuration to the ground of the drive circuit substrate 30. In other words, the piezoelectric element $PZ_1$ contracts due to the electric potential difference between the drive signal $V_1$ and ground, and a droplet of the color filter material having a discharge amount that corresponds to the drive signal $V_1$ is thereby discharged from the nozzle $N_1$. The piezoelectric element $PZ_2$ contracts due to the electric potential difference between the drive signal $V_2$ and ground, and a droplet of the color filter material having a discharge amount that corresponds to the drive signal $V_2$ is thereby discharged from the nozzle $N_2$. The same applies thereafter through piezoelectric element $PZ_{180}$ contracts due to the electric potential difference between the drive signal $V_{180}$ and ground, and a droplet of the color filter material having a discharge amount that corresponds to the drive signal $V_{180}$ is thereby discharged from the nozzle $N_{180}$.

The operation of the present droplet discharge device IJ configured in this manner is described next.

First, the discharge data SIA set in advance in accordance with the pixel pattern of the color filter substrate P and the COM selection data SIB set for each nozzle duty are stored in the drawing data memory 32 of the drive circuit substrate 30, and the drive waveform data of COM1 to COM4 that correspond to the COM selection data SIB are stored in advance in the first drive waveform memory 34 and the second drive waveform memory 35.

Specifically, the control device 11 outputs to the drawing data memory 32 via the interface 31 the drawing data SI (discharge data SIA and COM selection data SIB), the drawing data address signal AD1 that indicates the storage address of the discharge data SIA and the COM selection data SIB, the drawing data write enable signal WE 1 showing a data write request, the chip selector signal CS1, and the output enable signal OE1. The discharge data SIA and the COM selection data SIB are thereby sequentially stored in the drawing data memory 32 in the storage address specified by the drawing data address signal AD1.

The control device 11 outputs the drive waveform data signal WD, the waveform data address signal AD2, the waveform data write enable signal WE2 indicating a data write request, the chip selector signal CS2, and the output enable signal OE2 to the first drive waveform memory 34 and the second drive waveform memory 35 via the interface 31. In accordance with this process, the discharge data SIA set in advance in accordance with the pixel pattern of the color filter substrate P and the COM selection data SIB set for each nozzle duty are stored in the drawing data memory 32, and the drive waveform data of the COM1 to COM4 corresponding to the COM selection data SIB are stored in the first drive waveform memory 34 and the second drive waveform memory 35.

The operation for discharging color filter material onto the color filter substrate P is described next with reference to the timing chart of FIG. 16.

When the color filter substrate P is conveyed to the work stage 2, the control device acquires information (pixel pattern, substrate size, and other information) related to the color filter substrate P from a higher-order control device, and then determines the discharge data SIA that corresponds to the color filter substrate P thus conveyed. The control device 11 calculates the nozzle duty based on the information related to the color filter substrate P, and determines the COM selection data SIB that corresponds to the nozzle duty. The control device 11 controls the stage movement device 3 and the carriage movement device 6, and moves the droplet discharge head 5 to a predetermined XYZ on the color filter substrate P.

Next, the control device 11 outputs to the drawing data memory 32 of the drive circuit substrate 30 the drawing data address signal AD1 indicating the storage address of the discharge data SIA and the COM selection data SIB determined as described above, the drawing data write enable signal WE1 indicating a data read request, the chip selector signal CS1, and the output enable signal OE1. The discharge data SIA that corresponds to the conveyed color filter substrate P is outputted to the switching circuit 50 (i.e., the shift register circuit 51) of the droplet discharge head 5, and the COM selection data SIB that corresponds to the nozzle duty of the color filter substrate P is outputted to the COM selection circuit 40 (i.e., the shift register circuit 41) of the droplet discharge head 5. The drive waveform number data WN included in the COM selection data SIB is outputted to the address conversion circuit 33.

It is presumed that the discharge data SIA is outputted to the shift register circuit 51 of the switching circuit 50 at time T1, and that the COM selection data SIB is outputted to the shift register circuit 41 of the COM selection circuit 40, as shown in FIG. 16. The shift register circuit 51 converts the discharge data SIA, which is serial data, to parallel data that is sequentially outputted to the latch circuit 52 in synchronization with the clock signal CLK during the interval of time T1 to T2. In other words, the SIH data ($SIH_1$ to $SIH_{180}$) and the SIL data ($SIL_1$ to $SIL_{180}$) that correspond to the piezoelectric elements $PZ_1$ to $PZ_{180}$ are sequentially outputted in parallel. On the hand, the shift register circuit 41 converts the COM selection data SIB, which is serial data, to parallel data that is sequentially outputted to the latch circuit 42 in synchronization with the clock signal CLK in the interval of the clock time T1 to T2. In other words, the WSH data ($WSH_1$ to $WSH_{180}$) and the WSL data ($WSL_1$ to $WSL_{180}$) that correspond to the piezoelectric elements $PZ_1$ to $PZ_{180}$ are sequentially outputted in parallel.

Figure 17:
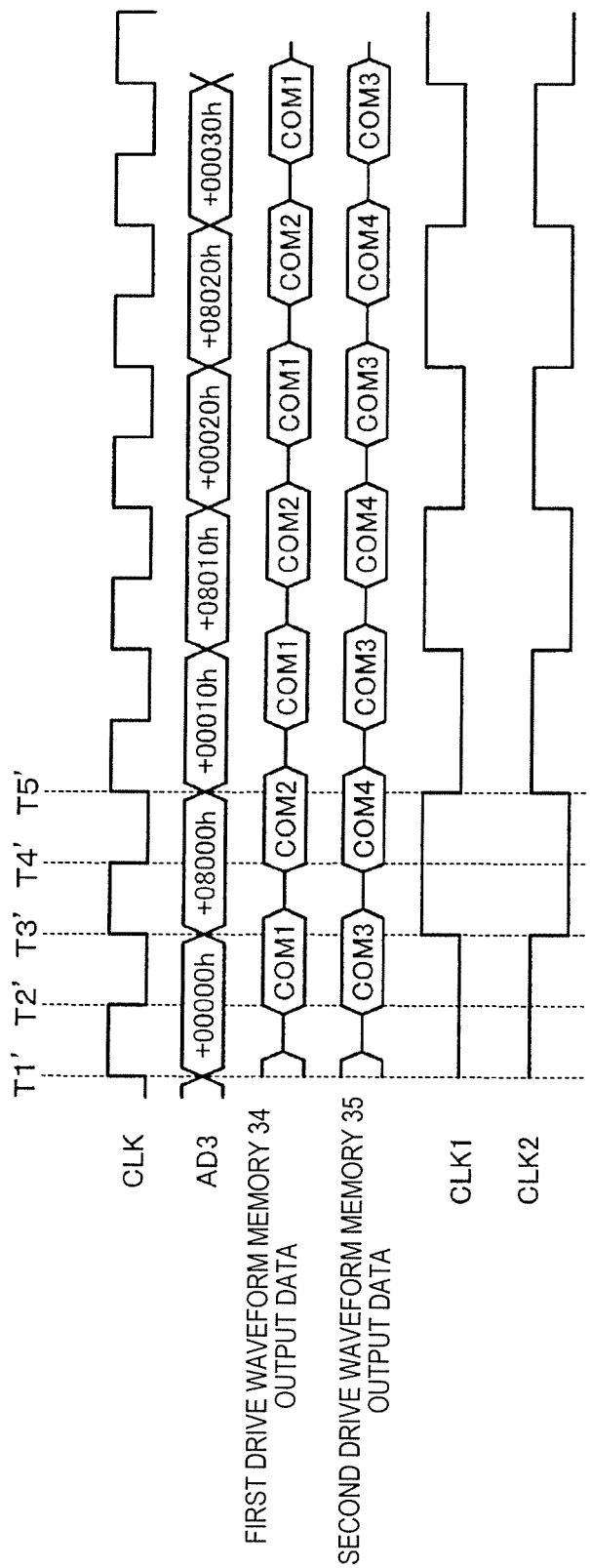
FIG. 17 is a second timing chart showing the operation of the droplet discharge device IJ.

Described hereinbelow with reference to the timing chart of FIG. 17 is the operation of the address conversion circuit 33, the first drive waveform memory 34, the second drive waveform memory 35, the first D/A converter 36, the second D/A converter 37, the third D/A converter 38, and the fourth D/A converter 39 in the interval of time T1 to T2.

The address conversion circuit 33 at time T1' outputs the address signal AD3, which indicates the storage address of the drive waveform data that corresponds to the drive waveform number specified by the drive waveform number data WN, to the first drive waveform memory 34 and the second drive waveform memory 35 in synchronization with the rise of the clock signal CLK, as shown in FIG. 17. For example, the address signal AD3 shows the address "+00000h" presuming the case that the drive waveform number "0" has been specified. At time T2', the first drive waveform memory 34 outputs the drive waveform data of two bytes of COM1 stored in the address "+00000h" to the first D/A converter 36 and the second D/A converter 37, and the second drive waveform memory 35 outputs the drive waveform data of two bytes of COM3 stored in the address "+00000h" to the third D/A converter 38 and the fourth D/A converter 39.

At time T3', when the DAC clock signal CLK1 rises, the first D/A converter 36 latches and receives the two bytes of drive waveform data of COM1 in synchronization with the rise of the DAC clock signal CLK1. Similarly, the third D/A converter 38 also latches and receives the two bytes of drive waveform data of COM3 in synchronization with the rise of the DAC clock signal CLK1.

Also at time T3', the address conversion circuit 33 outputs the address signal AD3 indicating the address "+08000h" to the first drive waveform memory 34 and the second drive waveform memory 35 in synchronization with the rise of the clock signal CLK. At time T4', the first drive waveform memory 34 outputs the drive waveform data of two bytes of COM2 stored in the address "+08000h" to the first D/A converter 36 and the second D/A converter 37, and the second drive waveform memory 35 outputs the drive waveform data of two bytes of COM4 stored in the address "+08000h" to the third D/A converter 38 and the fourth D/A converter 39.

At time T5', when the DAC clock signal CLK2 rises, the second D/A converter 37 latches and receives the two bytes of drive waveform data of COM2 in synchronization with the rise of the DAC clock signal CLK2. Similarly, the fourth D/A converter 39 also latches and receives the two bytes of drive waveform data of COM4 in synchronization with the rise of the DAC clock signal CLK2.

In this manner, the first D/A converter 36 receives only the drive waveform data of COM1, the second D/A converter 37 receives only the drive waveform data of COM2, the third D/A converter 38 receives only the drive waveform data of COM3, and the fourth D/A converter 39 receives only the drive waveform data of COM4. The address conversion circuit 33 thereafter increments the address in synchronization with the rise of the clock signal CLK, and the drive waveform data of COM1 to COM4 having 512 bytes (a single waveform) that correspond to the drive waveform number "0" are outputted from the first drive waveform memory 34 and the second drive waveform memory 35.

The first D/A converter 36 receives drive waveform data of COM1 contained in a single waveform, converts the data to analog to generate and output the drive signal COM1 to the COM selection circuit 40 of the droplet discharge head 5. The second D/A converter 37 receives the drive waveform data of COM2 contained in a single waveform, and converts the data to analog to generate and output the drive signal COM2 to the COM selection circuit 40 of the droplet discharge head 5. The third D/A converter 38 receives the drive waveform data of COM3 contained in a single waveform, and converts the data to analog to generate and output the drive signal COM3 to the COM selection circuit 40 of the droplet discharge head 5. The fourth D/A converter 39 receives the drive waveform data of COM4 contained in a single waveform, and converts the data to analog to generate and output the drive signal COM4 to the COM selection circuit 40 of the droplet discharge head 5.

In this manner, the operations shown in FIG. 17 are carried out in the interval of time T1 to T2 of FIG. 16 and the drive signals COM1 to COM4 are inputted to the COM selection circuit 40 of the droplet discharge head 5. In the operations shown in FIG. 17, the waveform data write enable signal WE2 indicating a data read request, the chip selector signal CS2, and the output enable signal OE2 are inputted to the first drive waveform memory 34 and the second drive waveform memory 35.

With reference again to FIG. 16, when the latch signal LT rises at time T3, the latch circuit 42 of the COM selection circuit 40 latches the WSH data ($WSH_1$ to $WSH_{180}$) and the WSL data ($WSL_1$ to $WSL_{180}$) in synchronization with the rise of the latch signal LT, and outputs the WSH data ($WSH_1$ to $WSH_{180}$) and the WSL data ($WSL_1$ to $WSL_{180}$) in a single process to the COM selection switching circuits $CSW_1$ to $CSW_{180}$ at time T4 when the latch signal LT falls. In this case, as shown in FIG. 16, the data ($WSH_1$, $WSL_1$)=(0, 1) is inputted to the COM selection switching circuit $CSW_1$, the data ($WSH_2$, $WSL_2$)=(0, 1) is inputted to the COM selection switching circuit $CSW_2$, and so forth through the data ($WSH_{180}$, $WSL_{180}$)=(0, 1) being inputted to the COM selection switching circuit $CSW_{180}$. In other words, the COM selection switching circuits $CSW_1$ to $CSW_{180}$ select the drive signal COM2 and output the drive signals $V_1$ to $V_{180}$ to the COM selection circuit 40. The COM1 to COM4 generated from the drive waveform data that corresponds to the drive waveform number "0" is a flat waveform having a slightly higher ground level, as shown in FIG. 16. The COM1 to COM4 generated from the drive waveform data that corresponds to the drive waveform data "0" is used for causing the piezoelectric elements $PZ_1$ to $PZ_{180}$ to transition to a wait state when the power source of the present droplet discharge device IJ is switched on or at other times, and are set to voltage values at which droplets are not discharged.

At time T3, the latch circuit 52 of the switching circuit 50 latches the SIH data ($SIH_1$ to $SIH_{180}$) and the SIL data ($SIL_1$ to $SIL_{180}$) in synchronization with the rise of the latch signal LT, and outputs the SIH data ($SIH_1$ to $SIH_{180}$) and the SIL data ($SIL_1$ to $SIL_{180}$) in a single process to the OR-circuits $OR_1$ to $OR_{180}$ at time T4 when the latch signal LT falls. Here, as shown in FIG. 16, the data ($SIH_1$, $SIL_1$)=(0, 1) is inputted to the OR-circuit $OR_1$, the data ($SIH_2$, $SIL_2$)=(0, 1) is inputted to the OR-circuit $OR_2$, and so forth through the data ($SIH_{180}$, $SIL_{180}$)=(0, 1) being inputted to the OR-circuit $OR_{180}$. In other words, the OR-circuits $OR_1$ to $OR_{180}$ output high-level switching signals $S_1$ to $S_{180}$ to the level shifter circuit 53, and the level shifter circuit 53 amplifies and outputs the switching signals $S_1$ to $S_{180}$ to the switching elements $SW_1$ to $SW_{180}$.

As described above, at time T4, the high-level switching signals $S_1$ to $S_{180}$ are inputted to the switching elements $SW_1$ to $SW_{180}$, whereby the switching elements $SW_1$ to $SW_{180}$ are set in an ON state, and the drive signals $V_1$ to $V_{180}$ fed from the COM selection circuit 40 are inputted to the corresponding piezoelectric elements $PZ_1$ to $PZ_{180}$. The piezoelectric elements $PZ_1$ to $PZ_{180}$ thereby transition to a wait state and preparation for droplet discharge is completed.

At time T5, the control device 11 subsequently outputs to the drawing data memory 32 of the drive circuit substrate 30 the drawing data address signal AD1 indicating the storage address of the discharge data SIA and the COM selection data SIB, the drawing data write enable signal WE1 indicating a data read request, the chip selector signal CS1, and the output enable signal OE1. Here, the subsequent discharge data SIA and COM selection data SIB are data for discharging droplets in the current position of the droplet discharge head 5. The discharge data SIA that corresponds to the current position of the droplet discharge head 5 is thereby outputted to the switching circuit 50 (i.e., the shift register circuit 51) of the droplet discharge head 5, and the COM selection data SIB is outputted to the COM selection circuit 40 (i.e., the shift register circuit 41) of the droplet discharge head 5. The drive waveform number data WN included in the COM selection data SIB is outputted to the address conversion circuit 33. In this case, the drive waveform number "1" is specified.

At time T5, the discharge data SIA is outputted to the shift register circuit 51 of the switching circuit 50, and the COM selection data SIB is outputted to the shift register circuit 41 of the COM selection circuit 40. The shift register circuit 51 converts the discharge data SIA, which is serial data, to parallel data that is sequentially outputted to the latch circuit 52 in synchronization with the clock signal CLK during the interval of time T5 to T6. Here, as a result of the operation described in FIG. 17, in the interval of time T5 to T6, the drive signal COM1 of a single waveform that corresponds to the drive waveform number "1" is outputted from the first D/A converter 36 to the COM selection circuit 40 of the droplet discharge head 5; the drive signal COM2 of a single waveform that corresponds to the drive waveform number "1" is outputted from the second D/A converter 37 to the COM selection circuit 40 of the droplet discharge head 5; the drive signal COM3 of a single waveform that corresponds to the drive waveform number "1" is outputted from the third D/A converter 38 to the COM selection circuit 40 of the droplet discharge head 5; and the drive signal COM4 of a single waveform that corresponds to the drive waveform number "1" is outputted from the fourth D/A converter 39 to the COM selection circuit 40 of the droplet discharge head 5;

When the latch signal LT rises at time T7, the latch circuit 42 of the COM selection circuit 40 latches the WSH data ($WSH_1$ to $WSH_{180}$) and the WSL data ($WSL_1$ to $WSL_{180}$) in synchronization with the rise of the latch signal LT, and outputs the WSH data ($WSH_1$ to $WSH_{180}$) and the WSL data ($WSL_1$ to $WSL_{180}$) in a single process to the COM selection switching circuits $CSW_1$ to $CSW_{180}$ at time T8 when the latch signal LT falls. In this case, as shown in FIG. 16, the data ($WSH_1$, $WSL_1$)=(1, 0) is inputted to the COM selection switching circuit $CSW_1$, the data ($WSH_2$, $WSL_2$)=(1, 0) is inputted to the COM selection switching circuit $CSW_2$, and so forth through the data ($WSH_{180}$, $WSL_{180}$)=(0, 0) being inputted to the COM selection switching circuit $CSW_{180}$. In other words, the COM selection switching circuits $CSW_1$ and $CSW_2$ select the drive signal COM3, the COM selection switching circuit $CSW_{180}$ selects the drive signal COM1, and the drive signals $V_1$ to $V_{180}$ are outputted to the switching circuit 50.

At time T7, the latch circuit 52 of the switching circuit 50 latches the SIH data ($SIH_1$ to $SIH_{180}$) and the SIL data ($SIL_1$ to $SIL_{180}$) in synchronization with the rise of the latch signal LT, and outputs the SIH data ($SIH_1$ to $SIH_{180}$) and the SIL data ($SIL_1$ to $SIL_{180}$) in a single process to the OR-circuits $OR_1$ to $OR_{IN}$ at time T8 when the latch signal LT falls. In this case, as shown in FIG. 16, the data ($SIH_1$, $SIL_1$)=(1, 0) is inputted to the OR-circuit $OR_1$, the data ($SIH_2$, $SIL_2$)=(1, 0) is inputted to the OR-circuit $OR_2$, and so forth through the data ($SIH_{180}$, $SIL_{180}$)=(1, 0) being inputted to the OR-circuit $OR_{180}$. In other words, the OR-circuits $OR_1$ to $OR_{180}$ output high-level switching signals $S_1$ to $S_{180}$ to the level shifter circuit 53, and the level shifter circuit 53 amplifies and outputs the switching signals $S_1$ to $S_{180}$ to the switching elements $SW_1$ to $SW_{180}$.

As described above, at time T8, the high-level switching signals $S_1$ to $S_{180}$ are inputted to the switching elements $SW_1$ to $SW_{180}$, whereby the switching elements $SW_1$ to $SW_{180}$ are set in an ON state, and the drive signals $V_1$ to $V_{180}$ fed from the COM selection circuit 40 are inputted to the corresponding piezoelectric elements $PZ_1$ to $PZ_{180}$. The drive signal of COM3 is thereby fed to the piezoelectric elements $PZ_1$ and $PZ_2$, the drive signal of COM1 is fed to the piezoelectric element $PZ_{180}$, and droplets having a weight that corresponds to the respective drive signals are discharged onto the color filter substrate P. The operation as described above is repeatedly carried out in all the positions on the color filter substrate P to thereby form a color filter layer on all the pixels on the color filter substrate P.

At time T9, the data ($SIH_1$, $SIL_1$)=(0, 0) is inputted to the OR-circuit $OR_1$, the data ($SIH_2$, $SIL_2$)=(0, 0) is inputted to the OR-circuit $OR_2$, and so forth through the data ($SIH_{180}$, $SIL_{180}$)=(0, 0) being inputted to the OR-circuit $OR_{180}$. Therefore, the switching signals $S_1$ to $S_{180}$ all assume a low level, and the switching elements $SW_1$ to $SW_{180}$ are set in an OFF state. Accordingly, the drive signals COM1 to COM4 are fed to the droplet discharge head 5, but the drive signals $V_1$ to $V_{180}$ are not fed to the piezoelectric elements $PZ_1$ to $PZ_{180}$.

In the droplet discharge head 5, droplets that have been adjusted for the per-droplet discharge amount are discharged onto the color filter substrate P using drive waveforms adjusted in the manner described above. The discharge position of the nozzles is set by bitmap data, and main scans and sub-scans are repeated while droplets are discharged in a preset discharge pattern based on the bitmap data. A color filter having a uniform thickness with little nonuniformity is thereby formed over the entire surface of the color filter substrate P.

As described above, in accordance with the droplet discharge device IJ of the present embodiment, nonuniformity of the droplet discharge amount is reduced and a uniform film thickness can be formed because a single drive signal is selected from among the drive signals COM1 to COM4 for each piezoelectric element based on the COM selection data SIB set in advance based on the discharge characteristics of the nozzles in the droplet discharge head 5.

The waveforms (voltage values) of the drive signals COM1 to COM4 can be arbitrarily varied in accordance with the discharge characteristics of each droplet discharge head 5 by storing a plurality of combinations of waveform data assigned to the drive signals COM1 to COM4. Since drive signals that correspond to the nozzle duty are fed to the piezoelectric elements, the nonuniformity of the droplet discharge amount due to the effect of electrical crosstalk can be reduced.

The spatial arrangement between the nozzles N and the partition region PX1 is constantly the same and the discharge pattern does not vary in relation to the first panel region PA1 because the movement distance of the droplet discharge head 5 in the sub-scanning direction is set to an integral multiple of the arrangement interval GP in the sub-scanning direction of the partition region PX1. Accordingly, the discharge characteristics of the nozzles N for measuring using the discharge amount measurement device 13 may be a single discharge pattern for each droplet discharge head 5, the measurement time can be reduced, and drive control is facilitated. The uniformity of the discharge amount is considerably higher because the discharge amount is adjusted based on the discharge characteristics of the discharge pattern used in an actual discharge scan.

On the other hand, in the second panel region PA2, the movement distance of the sub-scan of the droplet discharge head 5 is not necessarily an integral multiple of the arrangement interval in the sub-scanning direction of the second partition region PX2. Therefore, the spatial arrangement between the nozzles N and the second partition region PX2 changes for each main scan and the discharge pattern also changes in accordance with therewith. For this reason, in the present embodiment, when droplets are to be discharged onto the second discharge region PA2, the nozzles lying over the partition region PX2 among the plurality of nozzles N are selected for each main scan, the droplets are discharged from the selected nozzles, and the drive waveforms of the plurality of drive elements PZ are controlled based on the distribution Qt of the average droplet discharge amount in each combination measured in advance for all combinations (discharge patterns) of selectable nozzles, so that the discharge amount of the droplets discharged from the plurality of nozzles N approximates the predetermined optimal amount. In accordance with this method, the discharge pattern, which is a combination of the discharge nozzles and the non-discharge nozzles, is different for each main scan, but the discharge characteristics of the nozzles measured in advance may be a single characteristic (discharge characteristics Qt). Therefore, drive control is made simpler than in the case where the discharge characteristics are measured for each and every discharge pattern and the drive waveforms of the drive elements PZ are calculated for each discharge pattern based on the discharge characteristics.

The combinations (e.g., discharge patterns Pat1 to Pat3 of FIG. 7) of a plurality of nozzles used for measuring distribution Qt of the discharge amounts are all nozzle combinations used in actual discharges. Accordingly, it is possible to obtain a distribution that approximates the distribution (e.g., distributions Q1 to Q3 of the discharge amounts of FIG. 7) of the discharge amounts of the discharge patterns used in actual discharges. Therefore, when the discharge amount of each nozzle N is adjusted based on the distribution Qt of such discharge amounts, the uniformity of the discharge amounts will not be compromised to a greater degree than when the discharge amounts are adjusted based on the distribution of the discharge amounts of the discharge pattern used for actual discharges.

Described in the embodiment above is an example of a single droplet discharge head 5 and a single drive circuit substrate 30 corresponding to the droplet discharge head, but the same configuration and operation can be used when there is a plurality of the droplet discharge heads 5 and drive circuit substrates 30. Piezoelectric elements are described as example of the drive elements, but no limitation is imposed thereby, and it is also possible to use other drive elements as long as the elements can change the volume of the cavities 24 in accordance with a drive signal and discharge droplets. In the embodiment described above, an example is described in which four types of drive signals COM1 to COM4 are used, but a plurality of types of drive signals may be used in accordance with device costs, the size of the drive circuit substrate 30, and other design conditions.

General Interpretation of Terms

In understanding the scope of the present invention, the term "comprising" and its derivatives, as used herein, are intended to be open ended teaus that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A droplet discharge device adapted to arrange droplets onto a substrate including a first discharge region having a plurality of first partition regions arranged at a first interval in a first direction and a second discharge region having a plurality of second partition regions arranged at a second interval in the first direction that is different from the first interval, the droplet discharge device comprising:

a droplet discharge head having a plurality of nozzles for discharging droplets and a plurality of drive elements provided in correspondence with the nozzles, the droplet discharge head being configured and arranged to discharge droplets from the nozzles at a predetermined timing while the droplet discharge head is scanned with respect to the substrate in a main scanning direction corresponding to a second direction of the substrate that is orthogonal to the first direction and a sub-scanning direction corresponding to the first direction at predetermined movement intervals so that the droplets are selectively discharged onto the first and second partition regions disposed on the substrate, with the predetermined movement interval in the sub-scanning direction being equal to an integral multiple of the first interval; and a control unit configured to
control the drive waveforms of a prescribed set of drive elements corresponding to a prescribed set of the nozzles selected to discharge droplets during a main scan when the droplets are arranged in the first partition regions, based on a pre-measured distribution of a droplet discharge amount of each of the prescribed set of the nozzles so that the droplet discharge amount of each of the prescribed set of the nozzles approximates a predetermined optimal amount when the droplets are arranged in the first partition regions, and control the drive waveforms of the drive elements corresponding to the nozzles included in a plurality of potential combinations of the nozzles selected to discharge droplets during a main scan when the droplets are arranged in the second partition regions, based on a pre-measured distribution of an average droplet discharge amount of each of the nozzles calculated from an amount of droplets discharged from the each of the nozzles in all the potential combinations so that the droplet discharge amount of each of the nozzles approximates the predetermined optimal amount when the droplets are arranged in the second partition regions, the control unit including
- a drive signal selection section configured to select and feed one type among a plurality of types of drive signals to each of the drive elements,
- a first storage section configured to store drive signal selection data indicative of correspondence between each of the drive elements and the type of drive signal fed to each of the drive elements,
- a second storage section configured to store waveform data of the plurality of types of drive signals, and
- a drive signal generation section configured to acquire the waveform data of the plurality of types of drive signals from the second storage section and to generate the plurality of types of drive signals based on the waveform data,
- the drive signal selection section being configured to select the type of drive signal fed to each of the drive elements among the drive signals generated by the drive signal generation section, based on the drive signal selection data stored in the first storage section.

2. The droplet discharge device according to claim 1, wherein the first storage section is configured to store discharge data indicative of correspondence between each of the drive elements and information for specifying whether or not a drive signal is to be fed to each of the drive elements, and the control unit further includes a feed switching section configured to switch between feed and non-feed of a drive signal selected by the drive signal selection section for each of the drive elements based on the discharge data.

3. The droplet discharge device according to claim 2, wherein the drive signal selection section and the feed switching section of the control unit are mounted to the droplet discharge head, and the first storage section, the second storage section, and the drive signal generation section of the control unit are mounted to a drive circuit substrate.

4. The droplet discharge device according to claim 3, wherein the drive signals are of four types.

5. The droplet discharge device according to claim 1, wherein the drive elements are piezoelectric elements.

6. The droplet discharge device according to claim 1, further comprising a discharge amount measuring device having a recording medium onto which droplets are discharged from the nozzles, and an image-capturing device configured and arranged to capture an image of the droplets discharged onto the recording medium, the control unit being further configured to process the image of the droplets captured by the image-capturing device, to calculate a surface area over which each of the droplets is deposited on the recording medium, and to calculate the distribution of the droplet discharge amount of each of the nozzles based on the surface area.

7. The droplet discharge device according to claim 6, wherein the recording medium is a flexible sheet member having a porous ink-receiving layer in which pigments are bound by a binder, and the discharge amount measuring device includes a feed reel configured and arranged to feed the recording medium, and a take-up reel configured and arranged to take up the recording medium fed from the feed reel.

\* \* \* \* \*